(12) United States Patent
Han et al.

(10) Patent No.: US 10,021,674 B2
(45) Date of Patent: Jul. 10, 2018

(54) METHOD AND DEVICE OF TRANSMITTING CONTROL INFORMATION IN A WIRELESS COMMUNICATION SYSTEM

(75) Inventors: Seunghee Han, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/513,177

(22) PCT Filed: Sep. 7, 2011

(86) PCT No.: PCT/KR2011/006610
§ 371 (c)(1),
(2), (4) Date: Jun. 19, 2013

(87) PCT Pub. No.: WO2012/033335
PCT Pub. Date: Mar. 15, 2012

(65) Prior Publication Data
US 2013/0294353 A1 Nov. 7, 2013

Related U.S. Application Data

(60) Provisional application No. 61/405,191, filed on Oct. 20, 2010, provisional application No. 61/380,707, filed on Sep. 8, 2010.

(30) Foreign Application Priority Data

Sep. 6, 2011 (KR) .................. 10-2011-0090180

(51) Int. Cl.
*H04W 4/00* (2018.01)
*H04W 72/04* (2009.01)
(Continued)

(52) U.S. Cl.
CPC ........ *H04W 72/0406* (2013.01); *H04L 5/001* (2013.01); *H04L 5/0016* (2013.01);
(Continued)

(58) Field of Classification Search
USPC .................. 370/329, 330; 455/450
See application file for complete search history.

(56) References Cited

U.S. PATENT DOCUMENTS

2006/0274708 A1* 12/2006 Estraviz ............. H04L 1/0668
370/342
2008/0298488 A1* 12/2008 Shen ............... H04W 72/0406
375/260
(Continued)

FOREIGN PATENT DOCUMENTS

| CN | 101617489 | 12/2009 |
|---|---|---|
| CN | 101796749 | 8/2010 |

(Continued)

OTHER PUBLICATIONS

Usha, K., Sankar, K., Generation fo Walsh Codes in Two Different Orderings Using 4-bit Gray and Inverse Gray Codes, Indian Journal of Science and Technology, (Mar. 2012), vol. 5:3, pp. 2341-2345.*
(Continued)

*Primary Examiner* — Edan Orgad
*Assistant Examiner* — Sithu Ko
(74) *Attorney, Agent, or Firm* — Lee Hong Degerman Kang Waimey

(57) ABSTRACT

The present invention relates to a wireless communication system. In more detail, a method and device of transmitting a PUCCH signal in a wireless communication system include: (a) performing block-wise spreading on a first modulation symbol column by using a length-5 orthogonal sequence corresponding to a sequence index; (b) performing block-wise spreading on a second modulation symbol col-
(Continued)

umn by using a length-4 orthogonal sequence corresponding to the sequence index; (c) performing each cyclic shift and Discrete Fourier Transform (DFT) pre-coding on a plurality of modulation symbol columns obtained from (a) to (b); and (d) mapping a plurality of complex symbols obtained from (c) into a physical resource for PUCCH transmission.

16 Claims, 36 Drawing Sheets

(51) Int. Cl.
  *H04L 5/00* (2006.01)
  *H04L 27/26* (2006.01)
(52) U.S. Cl.
  CPC .......... *H04L 5/0053* (2013.01); *H04L 5/0055* (2013.01); *H04L 5/0057* (2013.01); *H04L 5/0012* (2013.01); *H04L 5/0023* (2013.01); *H04L 5/0044* (2013.01); *H04L 5/0048* (2013.01); *H04L 27/2636* (2013.01)

(56) References Cited

U.S. PATENT DOCUMENTS

| | | | |
|---|---|---|---|
| 2009/0046646 A1* | 2/2009 | Cho | H04B 1/7097 370/329 |
| 2009/0100300 A1* | 4/2009 | Kim | H03M 13/271 714/702 |
| 2009/0175159 A1 | 7/2009 | Bertrand et al. | |
| 2009/0196229 A1* | 8/2009 | Shen | H04B 1/69 370/328 |
| 2010/0040005 A1 | 2/2010 | Kim et al. | |
| 2010/0067512 A1* | 3/2010 | Nam | H04B 7/068 370/342 |
| 2010/0098012 A1 | 4/2010 | Bala et al. | |
| 2010/0173641 A1 | 7/2010 | Kim et al. | |
| 2011/0065446 A1* | 3/2011 | Mueck | H04W 72/082 455/452.2 |
| 2011/0243066 A1* | 10/2011 | Nayeb Nazar | H04L 1/007 370/328 |
| 2011/0261858 A1* | 10/2011 | Baldemair | H04J 11/0033 375/130 |
| 2012/0046032 A1* | 2/2012 | Baldemair | H04L 5/0053 455/434 |
| 2012/0263124 A1* | 10/2012 | Gaal | H04L 5/0053 370/329 |

FOREIGN PATENT DOCUMENTS

| | | |
|---|---|---|
| JP | 2009-049538 | 3/2009 |
| JP | 2009049538 | 3/2009 |
| JP | 2010-520699 | 6/2010 |
| JP | 2010520699 | 6/2010 |
| JP | 2013-507067 | 2/2013 |
| KR | 10-2008-0088525 | 10/2008 |
| KR | 10-2010-0020411 | 2/2010 |

OTHER PUBLICATIONS

Abouei, J., A Set of Cyclic Orthogonal Codes Acquired from Walsh-Hadamard Matrix, Sep. 2003, Proceedings of the 34th Iranian Mathematics Conference, Shahrood, Iran, pp. 1-6.*
Dinan, E. & Jabbari, B., "Spreading Codes for Direct Sequence CDMA and Wideband CDMA Cellular Networks," IEEE Communications Magazine, Sep. 1998, p. 52.*
Bahl, S., "Design and Prototyping a Fast Hadamard Transformer for WCDMA," IEEE Int'l Workshop on Rapid Systems Prototyping Proceedings, 2003, p. 1.*
Chen, H., CDMA Technologies, John Wiley & Sons (2007), p. 49.*
3rd Generation Partnership Project, Technical Specification Group Radio Access Network E-UTRA Physical Channels and Modulation, 3GPP TS 36.211, V.8.4.0 (Sep. 2008), p. 58.*
Garg., V. Wireless Communications & Networks (1st Ed.), Elsevier BV (2007), Appendix D.*
Qualcomm Inc., "Further details of PUCCH format 3," 3GPP TSG-RAN WG1 #62bis, R1-105555, Oct. 2010, 18 pages.
ZTE, "Details for A/N transmission based on DFT-s-OFDM," 3GPP TSG RAN WG1 Meeting #62, R1-104671, Aug. 2010, 9 pages.
NTT DOCOMO, "Investigation on PUCCH Format for Full A/N Transmission," 3GPP TSG RAN WG1 Meeting #61bis, R1-104015, Jun. 2010, 9 pages.
LG Electronics, "Further Details on PUCCH Format 3," 3GPP TSG RAN WG1 #63, R1-106100, Nov. 2010, 3 pages.
European Patent Office Application Serial No. 11823768.4, Search Report dated Nov. 11, 2015, 4 pages.
Nakao, et al., "Performance Enhancement of E-UTRA Uplink Control Channel in Fast Fading Environments," 2009 IEEE 69th Vehicular Technology Conference, XP031474732, Apr. 2009, 5 pages.

* cited by examiner

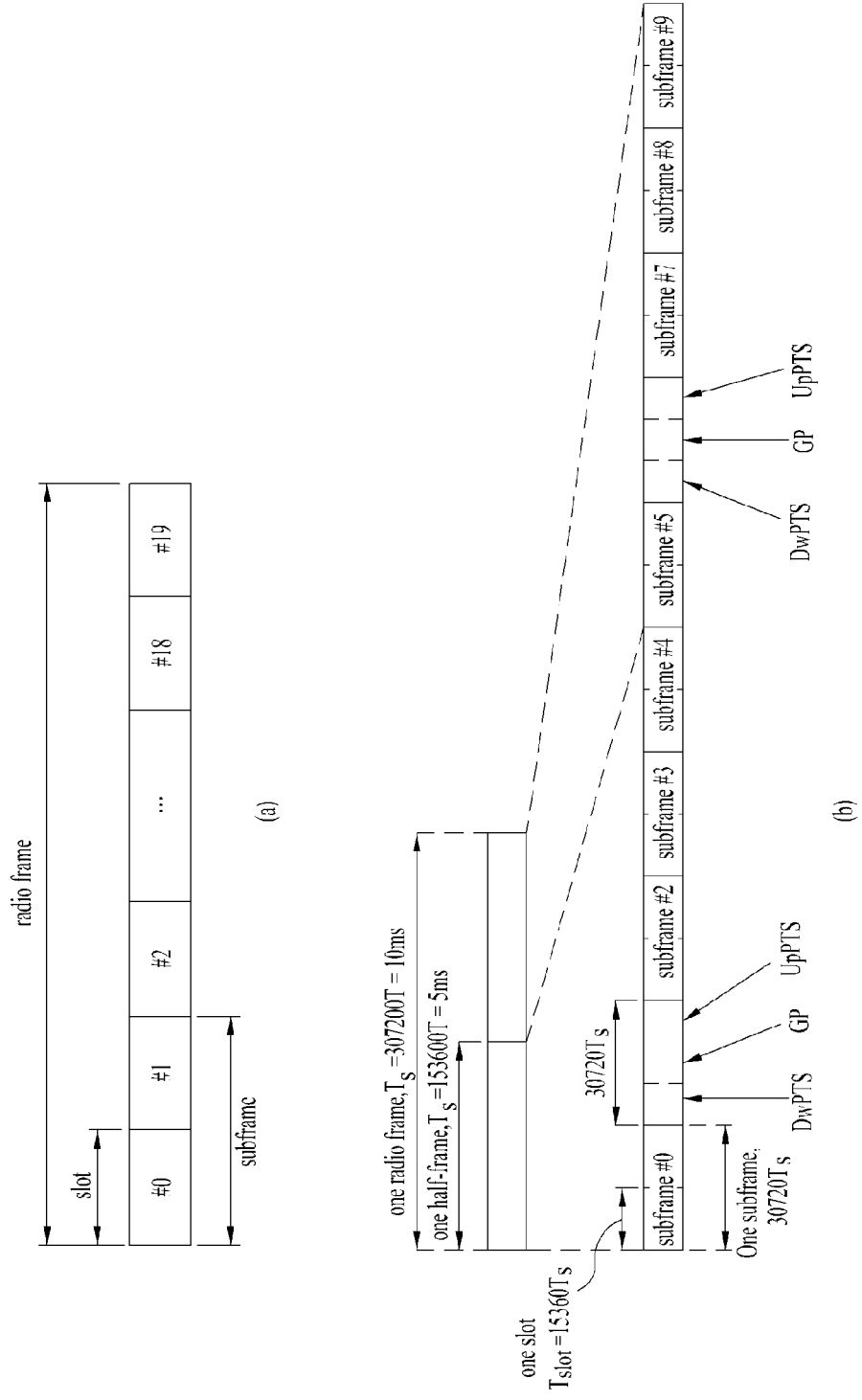

FIG. 5
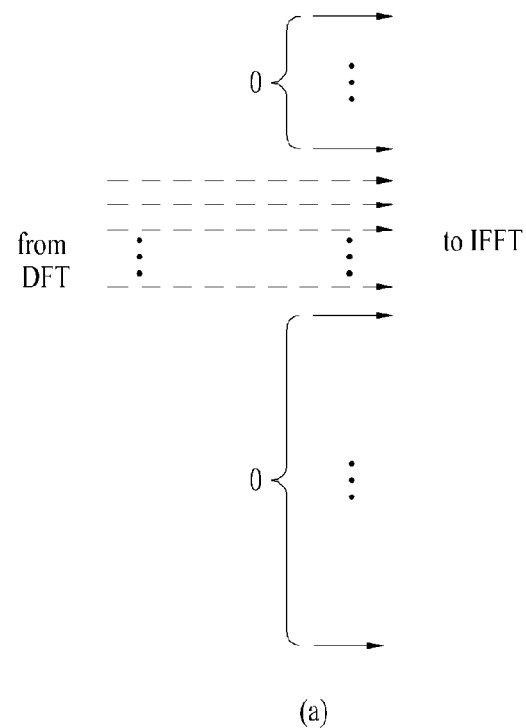
(a)
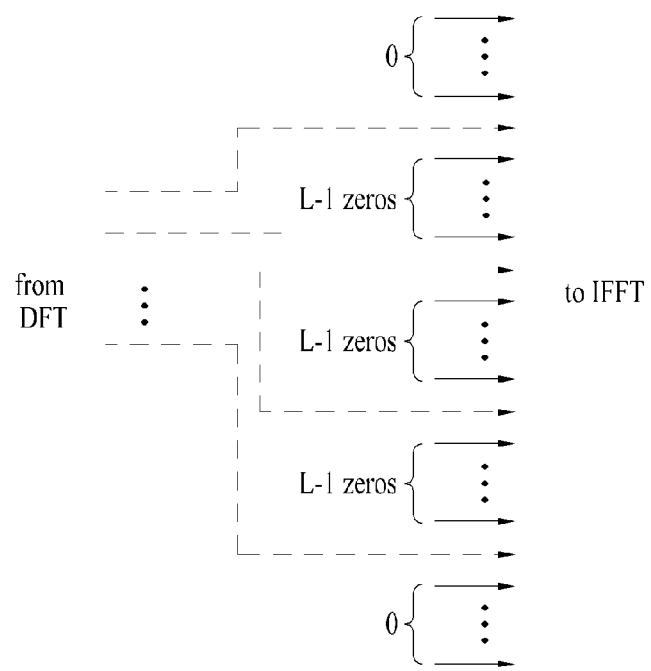
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\triangle_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\overline{n}_{OC} = 0$ | $\overline{n}_{OC} = 1$ | $\overline{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | 1 | 6 | | 1 | 6 | |
| 3 | 2 | | | 13 | | | 13 |
| 4 | 3 | 2 | 7 | | 2 | 7 | |
| 5 | 4 | | | 14 | | | 14 |
| 6 | 5 | 3 | 8 | | 3 | 8 | |
| 7 | 6 | | | 15 | | | 15 |
| 8 | 7 | 4 | 9 | | 4 | 9 | |
| 9 | 8 | | | 16 | | | 16 |
| 10 | 9 | 5 | 10 | | 5 | 10 | |
| 11 | 10 | | | 17 | | | 17 |
| 0 | 11 | | 11 | | | 11 | |

$\triangle_{shift}^{PUCCH} \in \{1,2,3\}$ for normal cyclic prefix
$\{1,2,3\}$ for extended cyclic prefix $\delta_{offset}^{PUCCH} \in \{0,1,...,\triangle_{shift}^{PUCCH} - 1\}$ Cell specific cyclic shift offset $n_{OC}$ Orthogonal sequence index for ACK/NACK
$\overline{n}_{OC}$ Orthogonal sequence index for RS
$n_{CS}$ Cyclic shift value of a CAZAC sequence
n' ACK/NACK resource index used for the channelization in a RB Cell-specific Cyclic shift value of CAZAC sequence Reuse of LTE PUCCH format 2 structure (normal CP case)

Reuse of LTE PUCCH format 2 structure (extended CP case)

Punctured DFT-based new PUCCH format (2 RS symbols)

METHOD AND DEVICE OF TRANSMITTING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/006610, filed on Sep. 7, 2011, which claims the benefit of earlier filing date and right of priority to Korean Application No. 10-2011-0090180, filed on Sep. 6, 2011, and also claims the benefit of U.S. Provisional Application Ser. Nos. 61/405,191, filed on Oct. 20, 2010, and 61/380,707, filed on Sep. 8, 2010, the contents of which are all incorporated by reference herein in their entirety.

TECHNICAL FIELD

The present invention relates to a wireless communication system, and more particularly to a method and apparatus for transmitting control information in a wireless communication system which can support carrier aggregation (CA).

BACKGROUND ART

Wireless communication systems have been widely deployed to provide various types of communication services such as voice or data services. Generally, a wireless communication system is a multiple access system that can communicate with multiple users by sharing available system resources (such as bandwidth, transmission (Tx) power, and the like). Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method and apparatus for effectively transmitting control information in a wireless communication system. Another object of the present invention is to provide a channel format and a signal processing method for effectively transmitting control information, and an apparatus for the same. A further object of the present invention is to provide a method and apparatus for effectively allocating resources for transmitting control information.

Objects of the present invention are not limited to those described above and other objects will be clearly understood by those skilled in the art from the following description.

Technical Solution

In one aspect of the present invention, provided herein is a method for a communication device to transmit a Physical Uplink Control Channel (PUCCH) signal in a wireless communication system, the method including (a) block-spreading a first modulation symbol using an orthogonal sequence of length 5 ($N_{SF}^{PUCCH}=5$) corresponding to a sequence index $n_{oc}$, (b) block-spreading a second modulation symbol using an orthogonal sequence of length 4 ($N_{SF}^{PUCCH}=4$) corresponding to the sequence index $n_{oc}$, (c) performing cyclic shifting and Discrete Fourier Transform (DFT) precoding upon a plurality of modulation symbol sequences obtained from the steps (a) and (b), and (d) mapping complex symbols obtained from the step (c) to physical resources for PUCCH transmission, wherein the orthogonal sequences of length 5 and length 4 are given by the following table.

| sequence index $n_{oc}$ | orthogonal sequence $[w_{n_{oc}}(0) \ldots w_{n_{oc}}(N_{SF}^{PUCCH}-1)]$ $N_{SF}^{PUCCH}=5$ | $N_{SF}^{PUCCH}=4$ |
|---|---|---|
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |

In another aspect of the present invention, provided herein is a communication device configured to transmit a Physical Uplink Control Channel (PUCCH) signal in a wireless communication system, the communication device including a Radio Frequency (RF) unit, and a processor, wherein the processor is configured for (a) block-spreading a first modulation symbol using an orthogonal sequence of length 5 ($N_{SF}^{PUCCH}=5$) corresponding to a sequence index $n_{oc}$, (b) block-spreading a second modulation symbol using an orthogonal sequence of length 4 ($N_{SF}^{PUCCH}=4$) corresponding to the sequence index $n_{oc}$, (c) performing cyclic shifting and Discrete Fourier Transform (DFT) precoding upon a plurality of modulation symbol sequences obtained through the block-spreading of the first modulation symbol and the second modulation symbol, and (d) mapping complex symbols obtained through the cyclic shifting and DFT precoding to physical resources for PUCCH transmission, wherein the orthogonal sequences of length 5 and length 4 are given by the following table.

| sequence index $n_{oc}$ | orthogonal sequence $[w_{n_{oc}}(0) \ldots w_{n_{oc}}(N_{SF}^{PUCCH}-1)]$ $N_{SF}^{PUCCH}=5$ | $N_{SF}^{PUCCH}=4$ |
|---|---|---|
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |

The PUCCH signal may be transmitted through a subframe for a Sounding Reference Signal (SRS).

The PUCCH signal may be transmitted using 5 Single Carrier Frequency Division Multiple Access (SC-FDMA) symbols in slot 0 and may be transmitted using 4 SC-FDMA symbols in slot 1.

The PUCCH signal may be transmitted using SC-FDMA symbols of indices 0, 2, 3, 4, and 6 in the slot 0 and may be transmitted using SC-FDMA symbols of indices 0, 2, 3, and 4 in the slot 1.

The first modulation symbol sequence may be transmitted through the slot 0 and the second modulation symbol sequence may be transmitted through the slot 1.

The PUCCH signal may include Uplink Control Information (UCI).

A plurality of serving cells may be configured in the communication device.

Advantageous Effects

According to the present invention, it is possible to effectively transmit control information in a wireless communication system. In addition, it is possible to provide a channel format and a signal processing method for effectively transmitting control information. It is also possible to effectively allocate resources for transmitting control information.

Advantages of the present invention are not limited to those described above and other advantages will be clearly understood by those skilled in the art from the following description.

DESCRIPTION OF DRAWINGS

The accompanying drawings, which are included as a part of the detailed description of the invention for better understanding of the invention, provide embodiments of the invention and illustrate the spirit of the invention in combination with the detailed description.

FIG. 2 illustrates the structure of a radio frame.

FIG. 5 illustrates a signal mapping scheme in the frequency domain for satisfying the single carrier properties.

FIG. 17 illustrates ACK/NACK channelization for PUCCH formats 1a and 1b.

BEST MODE

The following technologies may be used in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), or Enhanced Data Rates for GSM Evolution (EDGE). OFDMA may be implemented as a radio technology such as IEEE 802.11 (Wi-Fi), IEEE 802.16 (WiMAX), IEEE 802-20, or Evolved UTRA (E-UTRA). UTRA is a part of the Universal Mobile Telecommunications System (UMTS). 3$^{rd}$ Generation Partnership Project Long Term Evolution (3GPP LTE) is a part of the Evolved UMTS (E-UMTS) which uses E-UTRA. Although the following embodiments will be described focusing on 3GPP LTE/LTE-A for clarity of description, the technical features of the present invention are not limited to 3GPP LTE/LTE-A.

In a wireless communication system, a user equipment (UE) receives information from a base station or eNode B (eNB) in downlink (DL) and transmits information to the eNB in uplink (UL). Information transmitted or received between an eNB and a UE includes data and a variety of control information and various physical channels may be present according to the kind/use of information transmitted or received therebetween.

Figure 1:
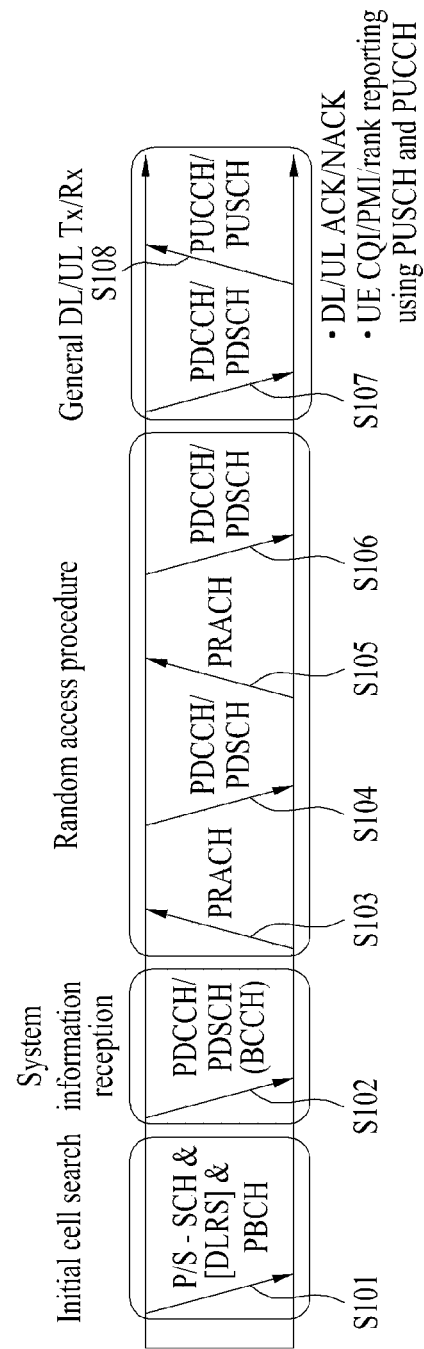
FIG. 1 illustrates physical channels used in a 3GPP LTE system, which is an exemplary wireless communication system, and a general signal transmission method using the physical channels.

FIG. 1 illustrates physical channels used in a 3GPP LTE system and a general signal transmission method using the same.

A UE performs an initial cell search operation such as synchronization with an eNB when power is turned on or when the UE enters a new cell in step S101. Here, the UE may receive a Primary Synchronization Channel (P-SCH)

and a Secondary Synchronization Channel (S-SCH) from the eNB to achieve synchronization with the eNB and acquire information such as a cell ID. Thereafter, the UE may receive a physical broadcast channel from the eNB to acquire broadcast information within the cell. In the initial cell search step, the UE may also receive a Downlink Reference Signal (DL RS) to check a downlink channel state.

When the UE has completed the initial cell search, the UE may receive a Physical Downlink Control Channel (PDCCH) and a Physical Downlink Shared Channel (PDSCH) according to information included in the PDCCH to acquire more detailed system information in step S102.

Thereafter, the UE may perform a Random Access Procedure (RACH) in steps S103 to S106 in order to complete access to the eNB. Here, the UE may transmit a preamble through a Physical Random Access Channel (PRACH) (S103) and receive a response message of the preamble through a PDCCH and a PDSCH corresponding to the PDCCH (S104). In the case of contention-based random access, the UE may perform a contention resolution procedure including additional PRACH transmission (S105) and reception of a PDCCH and a PDSCH corresponding to the PDCCH (S106).

After performing the above procedures, the UE may perform PDCCH/PDSCH reception (S107) and Physical Uplink Shared Channel PUSCH)/Physical Uplink Control Channel (PUCCH) transmission (S108) as a general uplink/downlink signal transmission procedure. All control information transmitted from the UE to the eNB is referred to as uplink control information (UCI). The UCI includes Hybrid Automatic Repeat and reQuest Acknowledgement/Negative-ACK (HARQ ACK/NACK), Scheduling Request (SR), a Channel Quality Indicator (CQI), a Precoding Matrix Index (PMI), a Rank Indicator (RI), etc. In this specification, a HARQ ACK/NACK is referred to as a HARQ-ACK or an ACK/NACK (A/N) for short. The HARQ-ACK includes at least one of a positive ACK (referred to as an ACK for short), a negative ACK (NACK), a DTX, and a NACK/DTX. Although the UCI is generally transmitted via a PUCCH, the UCI may also be transmitted via a PUSCH if control information and traffic data need to be simultaneously transmitted. The UCI may be aperiodically transmitted via a PUSCH according to a network request/instruction.

FIG. 2 shows the structure of a radio frame. In a cellular Orthogonal Frequency Division Multiplexing (OFDM) radio packet communication system, uplink/downlink data packets are transmitted in units of subframes. One subframe is defined as a predetermined time interval including a plurality of OFDM symbols. The 3GPP LTE standard supports a type 1 radio frame structure applicable to Frequency Division Duplexing (FDD) and a type 2 radio frame structure applicable to Time Division Duplexing (TDD).

FIG. 2(a) illustrates the structure of the type 1 radio frame. A downlink radio frame includes 10 subframes and one subframe includes two slots in the time domain. A time required to transmit one subframe is defined as a Transmission Time Interval (TTI). For example, one subframe may have a length of 1 ms and one slot may have a length of 0.5 ms. One slot includes a plurality of OFDM symbols in the time domain and includes a plurality of Resource Blocks (RBs) in the frequency domain. Since the 3GPP LTE system uses OFDMA in downlink, one OFDM symbol indicates one symbol interval. An OFDM symbol may be referred to as an SC-FDMA symbol or a symbol interval. An RB, which is a resource allocation unit, may include a plurality of contiguous subcarriers in one slot.

The number of OFDM symbols included in one slot may vary according to the configuration of a Cyclic Prefix (CP). The CP is classified into an extended CP and a normal CP. For example, when OFDM symbols are configured using normal CPs, the number of OFDM symbols included in one slot may be seven. When OFDM symbols are configured using extended CPs, the length of one OFDM symbol is increased such that the number of OFDM symbols included in one slot is less than that of the case of the normal CP. In case of the extended CP, for example, the number of OFDM symbols included in one slot may be six. When a channel state is unstable, for example, as when a UE moves at a high speed, the extended CP may be used in order to further reduce interference between symbols.

When the normal CP is used, one slot includes seven OFDM symbols and therefore one subframe includes 14 OFDM symbols. Here, up to the first three OFDM symbols of each subframe may be allocated to a Physical Downlink Control Channel (PDCCH) and the remaining OFDM symbols may be allocated to a Physical Downlink Shared Channel (PDSCH).

FIG. 2(b) illustrates the structure of the type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization, or channel estimation at a UE. The UpPTS is used for channel estimation and uplink transmission synchronization at an eNB. The guard period is an interval for removing interference occurring in uplink due to multi-path delay of a downlink signal between uplink and downlink.

The structure of the radio frame is only exemplary and the number of subframes included in the radio frame, the number of slots included in the subframe or the number of symbols included in the slot may be changed in various ways.

Figure 3A:
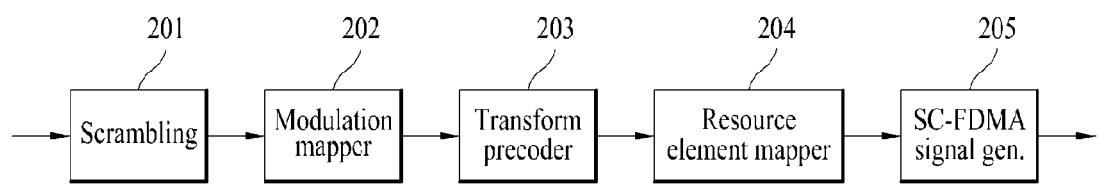
FIG. 3A illustrates an uplink signal processing procedure.

FIG. 3A illustrates a signal processing procedure that a UE performs for transmitting an uplink signal.

A scrambling module 210 may scramble a transmission signal using a UE-specific scrambling signal in order to transmit the uplink signal. The scrambled signal is input to the modulation mapper 220 and the modulation mapper 220 then modulates the scrambled signal into complex symbols using a modulation scheme, such as Binary Phase Shift Keying (BPSK), Quadrature Phase Shift Keying (QPSK), or 16 Quadrature Amplitude Modulation (16QAM)/64 Quadrature Amplitude Modulation (64QAM), according to the type of the transmission signal and/or a channel status. A transform precoder 230 processes and inputs the modulated complex symbols to a resource element mapper 240. The resource element mapper 240 may map the processed complex symbols to time-frequency resource elements. The mapped signal may be transmitted to the BS through an antenna via a Single Carrier-Frequency Division Multiple Access (SC-FDMA) signal generator 250.

Figure 3B:
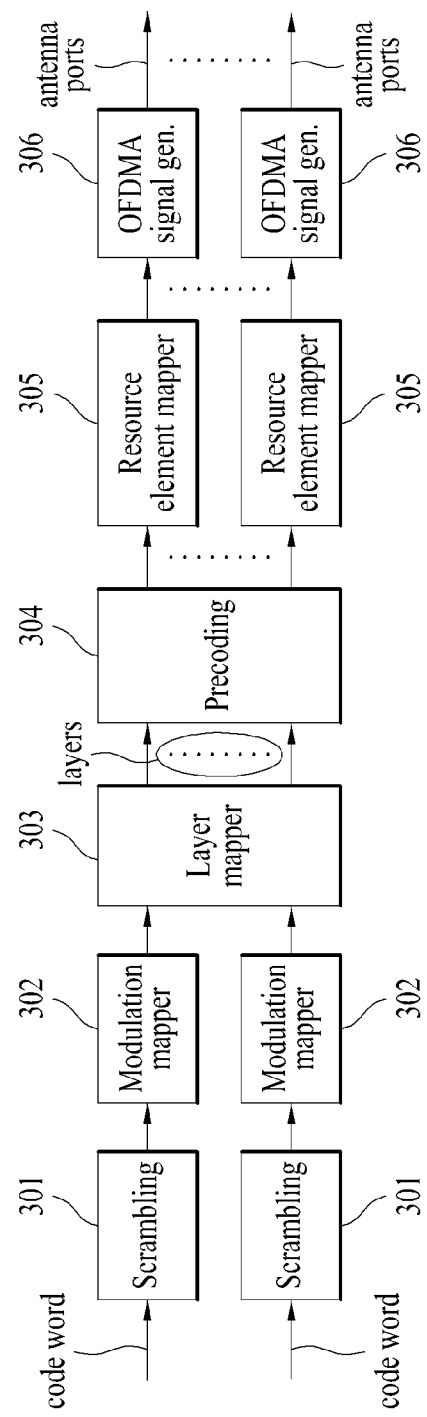
FIG. 3B illustrates a downlink signal processing procedure.

FIG. 3B illustrates a signal processing procedure that the BS performs for transmission of a downlink signal.

In the 3GPP LTE system, the BS may transmit one or more codewords in downlink. The codewords may be processed into complex symbols through a scrambling module 301 and a modulation mapper 302 in the same manner as in uplink. Thereafter, the modulated complex symbols may be mapped to a plurality of layers by a layer mapper 303 and each layer may then be allocated to a corresponding transmission antenna after being multiplied by a predetermined precoding matrix by a precoding module 304. The processed transmission signal of each antenna is mapped to a time-frequency resource element (RE) by an RE mapper 305 and may then be transmitted through a corresponding antenna via an OFDMA signal generator 306.

When a UE transmits an uplink signal in a wireless communication system, there may be a Peak to Average Power Ratio (PAPR) problem compared to when a BS transmits a downlink signal. Thus, uplink signal transmission is performed using the SC-FDMA scheme while downlink signal transmission is performed using the OFDMA scheme as described above with reference to FIGS. 3A and 3B.

Figure 4:
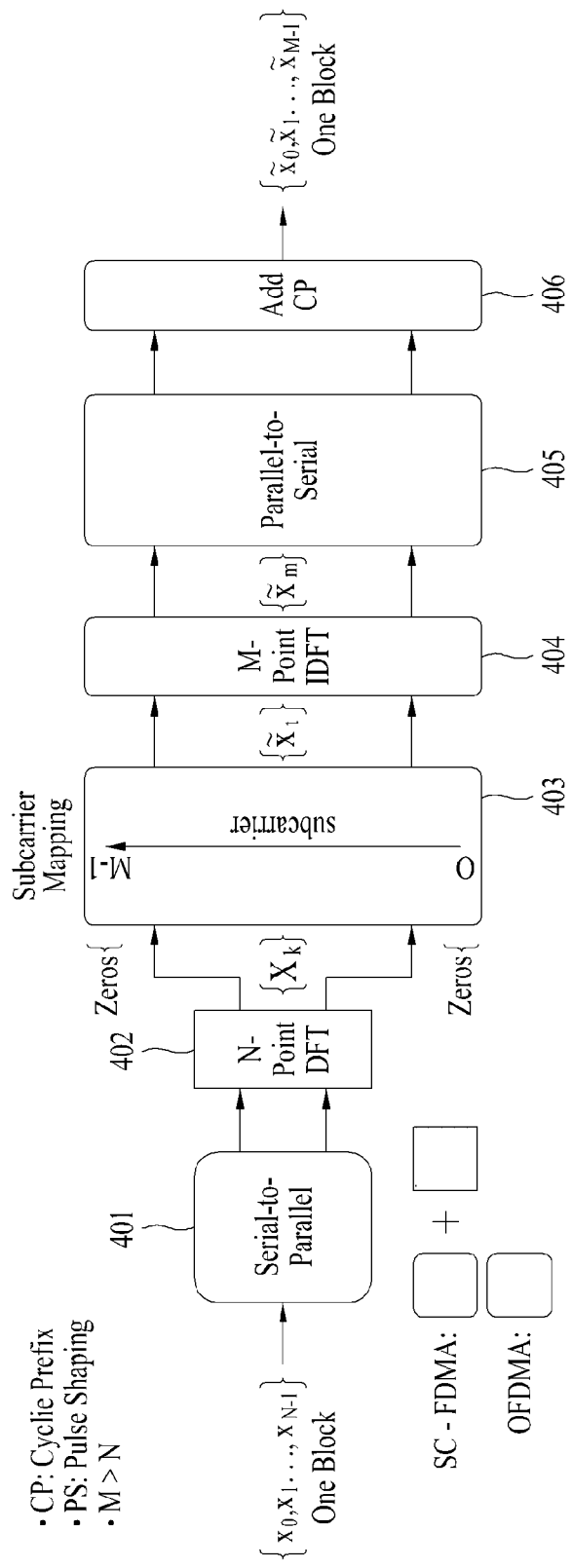
FIG. 4 illustrates an SC-FDMA scheme and an OFDMA scheme.

FIG. 4 illustrates an SC-FDMA scheme and an OFDMA scheme. The 3GPP system employs the OFDMA scheme in downlink and the SC-FDMA scheme in uplink. As shown in FIG. 4, a UE for uplink signal transmission and a BS for downlink signal transmission are similar in that both include a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402. The N-point DFT module 402 compensates for a certain part of the influence of IDFT processing of the M-point IDFT module 1504 to allow a transmission signal to have single carrier properties.

FIG. 5 illustrates a signal mapping scheme in the frequency domain for satisfying the single carrier properties. FIG. 5(a) shows a localized mapping scheme and FIG. 5(b) shows a distributed mapping scheme.

A clustered SC-FDMA scheme which is a modified form of the SC-FDMA scheme is described as follows. In the clustered SC-FDMA scheme, DFT process output samples are divided into sub-groups in a subcarrier mapping procedure and are non-contiguously mapped in the frequency domain (or subcarrier domain).

Figure 6:
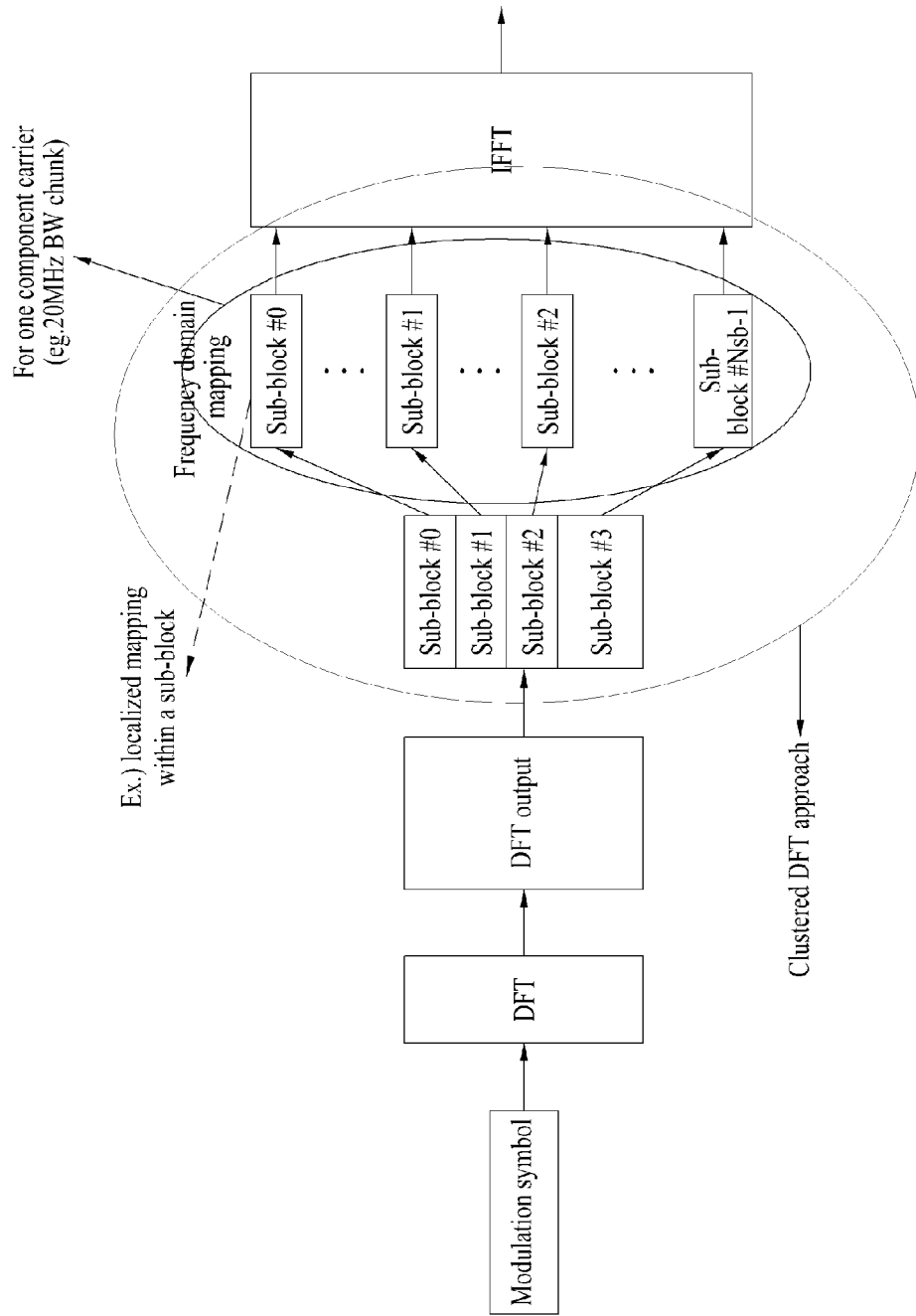
FIG. 6 illustrates a signal processing procedure in which DFT process output samples are mapped to a single carrier in clustered SC-FDMA.
Figure 7:
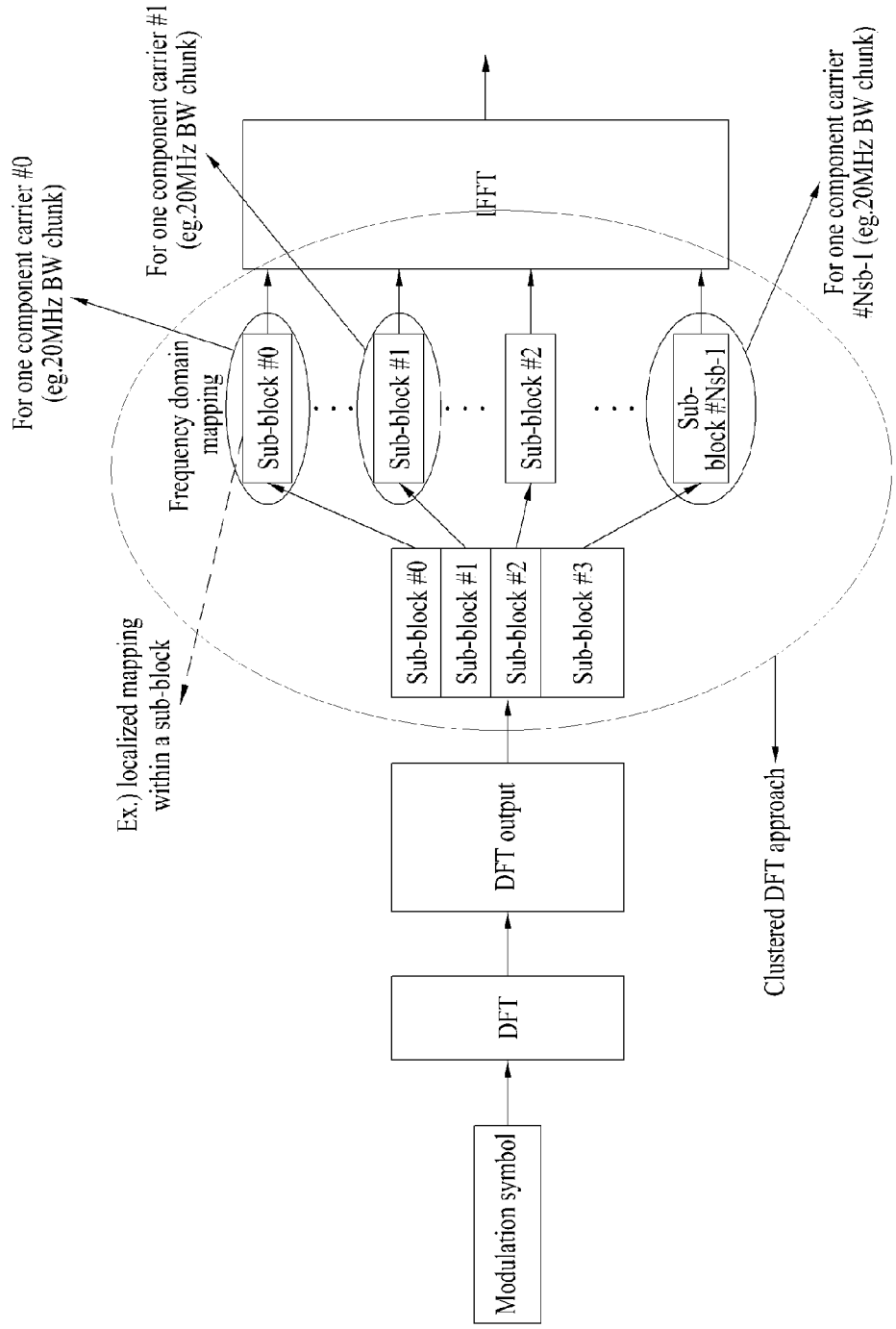
FIGS. 7 and 8 illustrate a signal processing procedure in which DFT process output samples are mapped to multiple carriers in clustered SC-FDMA.
Figure 8:
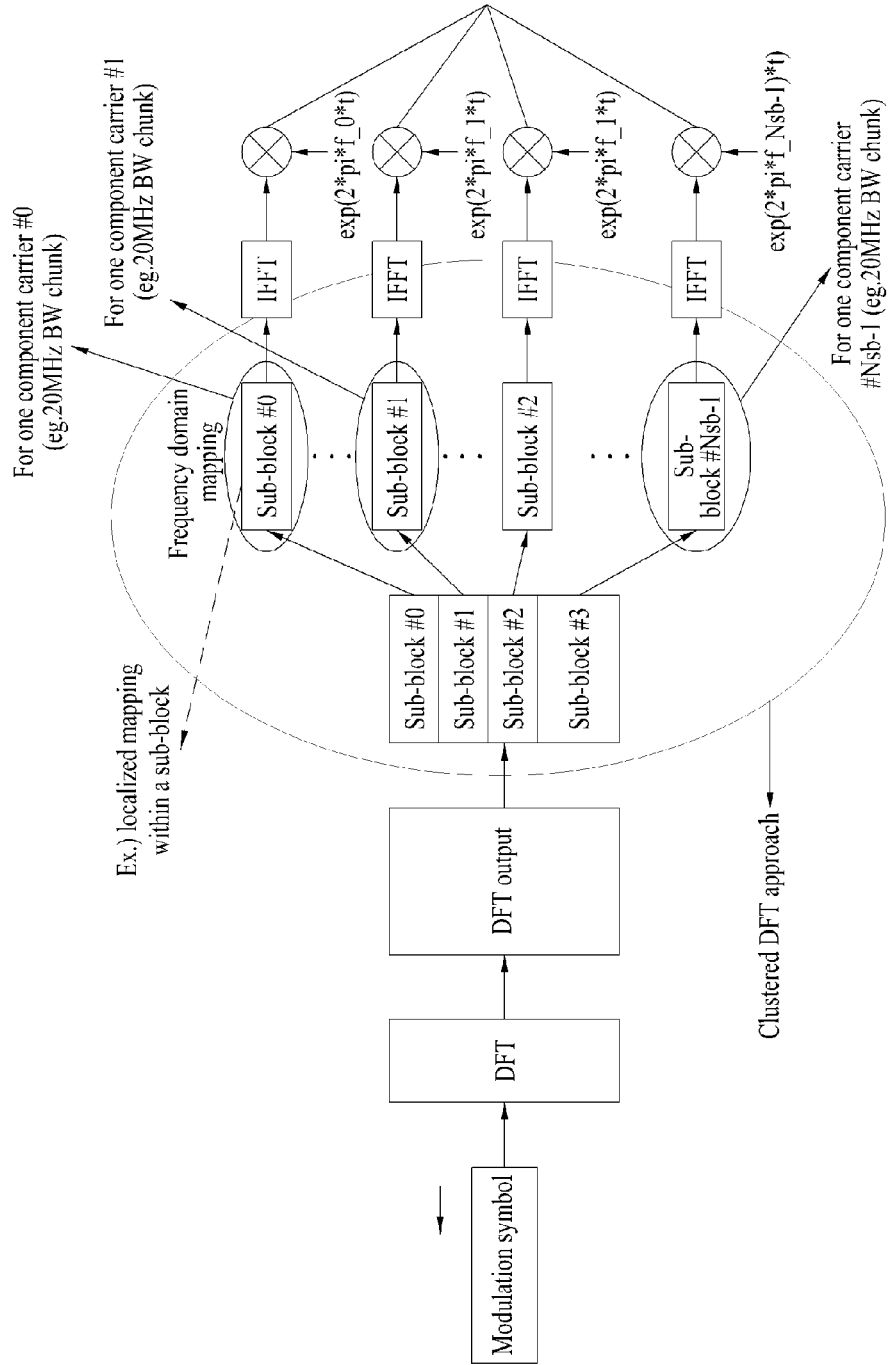

FIG. 6 shows a signal processing procedure in which DFT process output samples are mapped to a single carrier in the clustered SC-FDMA method. FIGS. 7 and 8 show a signal processing procedure in which DFT process output samples are mapped to multiple carriers in the clustered SC-FDMA method. Intra-carrier clustered SC-FDMA is applied to the example of FIG. 6 and inter-carrier clustered SC-FDMA is applied to the examples of FIGS. 7 and 8. Specifically, FIG. 7 shows an example in which a signal is generated through a single IFFT block when subcarrier spacings are defined between adjacent component carriers in the case in which component carriers are contiguously allocated to the frequency domain. FIG. 8 shows an example in which a signal is generated through a plurality of IFFT blocks when component carriers have been non-contiguously allocated to the frequency domain.

Figure 9:
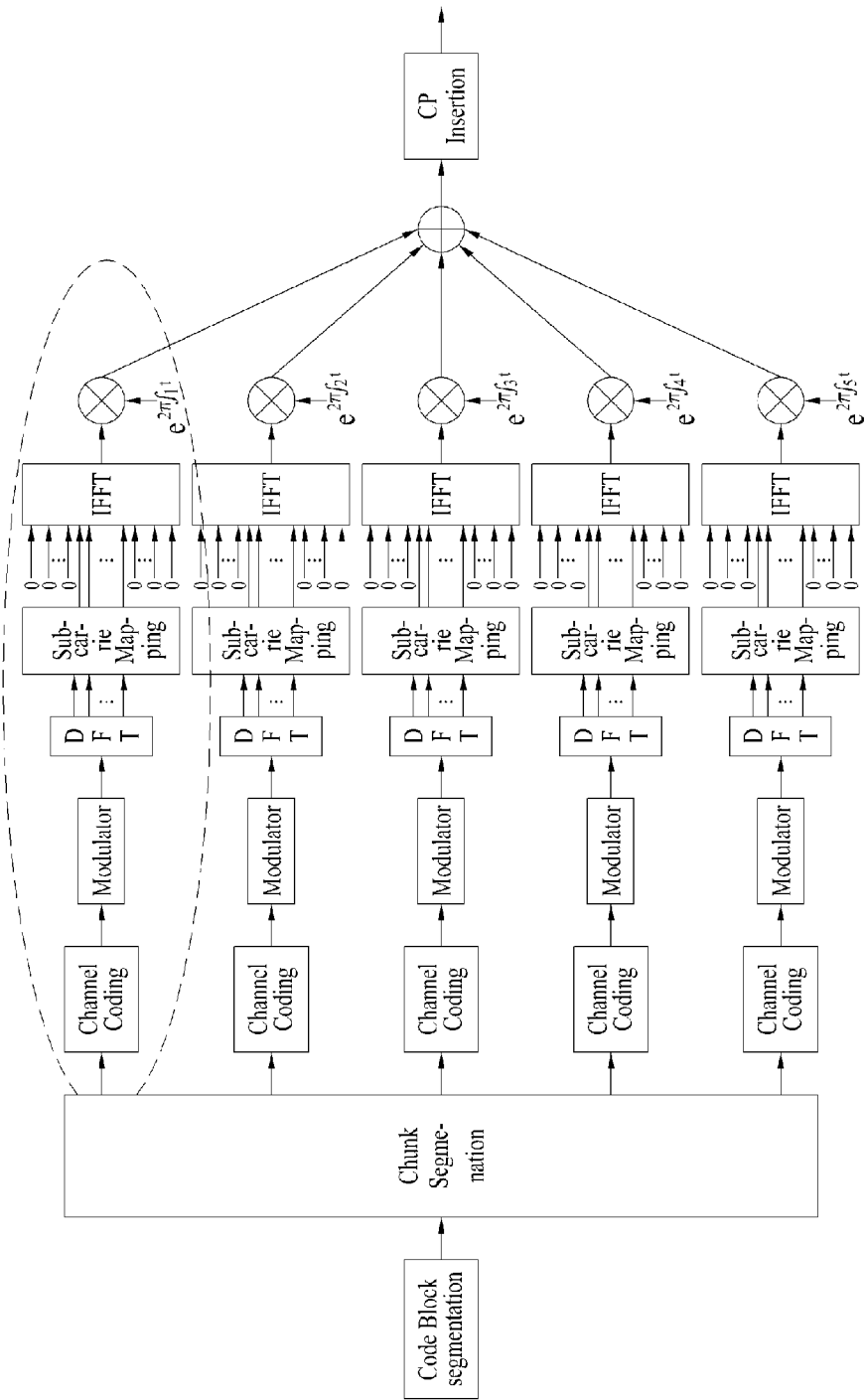
FIG. 9 illustrates a signal processing procedure in segmented SC-FDMA.

FIG. 9 shows a signal processing procedure in segmented SC-FDMA.

Segmented SC-FDMA simply extends the DFT spread and IFFT frequency subcarrier mapping structure of conventional SC-FDMA since DFTs and IFFTs are in a one-to-one relationship as the same number of IFFTs as that of DFTs is applied. Segmented SC-FDMA is also referred to as NxSC-FDMA or NxDFT-s-OFDMA. These schemes are collectively referred to as segmented SC-FDMA. As shown in FIG. 9, in order to alleviate the requirements of single carrier characteristics, the segmented SC-FDMA scheme groups all time-domain modulation symbols into N groups (N being an integer greater than 1) such that a DFT process is performed in units of a group.

Figure 10:
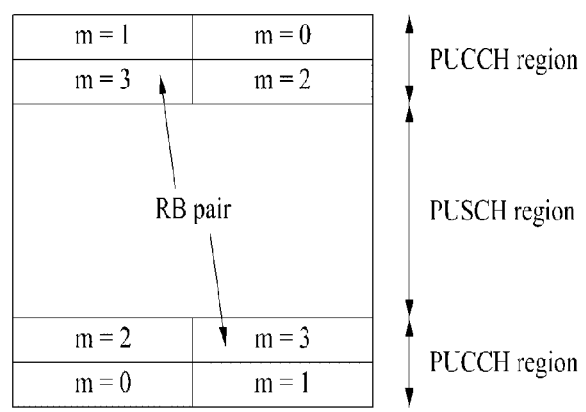
FIG. 10 illustrates the structure of an uplink subframe.

FIG. 10 illustrates the structure of a UL subframe.

As shown in FIG. 10, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 11:
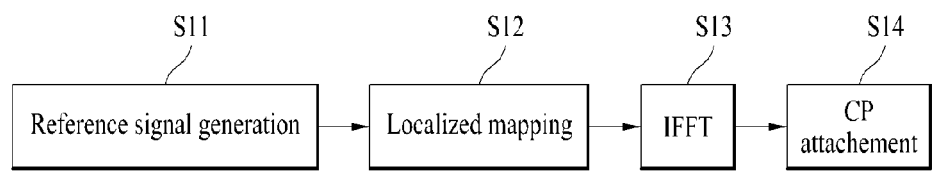
FIG. 11 illustrates a signal processing procedure for transmitting a Reference Signal (RS) in uplink.

FIG. 11 illustrates a signal processing procedure for transmitting a Reference Signal (RS) in the uplink. As shown in FIG. 11, data is transformed into a frequency domain signal by a DFT precoder and the signal is then transmitted after being subjected to frequency mapping and IFFT. On the other hand, an RS does not pass through the DFT precoder. More specifically, an RS sequence is directly generated in the frequency domain (S11) and is then transmitted after being sequentially subjected to a localized-mapping process (S12), an IFFT process (S13), and a CP attachment process (S14).

The RS sequence $r_{u,v}^{(\alpha)}(n)$ is defined by a cyclic shift a of a base sequence and may be expressed by Expression 1.

$$r_{u,v}^{(\alpha)}(n) = e^{j\alpha n} \bar{r}_{u,v}(n), \ 0 \leq n < M_{sc}^{RS}, \quad \text{Expression 1}$$

where $M_{sc}^{RS} = mN_{sc}^{RB}$ denotes the length of the RS sequence, $N_{sc}^{RB}$ denotes the size of a resource block represented in subcarriers, and m is $1 \leq m \leq N_{RB}^{max,UL}$. $N_{RB}^{max,UL}$ denotes a maximum UL transmission band.

A base sequence $\bar{r}_{u,v}(n)$ is divided into several groups. $u \in \{0, 1, \ldots, 29\}$ denotes group number, and v corresponds to a base sequence number in a corresponding group. Each group includes one base sequence v=0 having a length of $M_{sc}^{RS} = mN_{sc}^{RB}$ ($1 \leq m \leq 5$) and two base sequences v=0, 1 having a length of $M_{sc}^{RS} = mN_{sc}^{RB}$ ($6 \leq m \leq N_{RB}^{max,UL}$). The sequence group number u and the number v within a corresponding group may be changed with time. The base sequence $\bar{r}_{u,v}(0), \ldots, \bar{r}_{u,v}(M_{sc}^{RS}-1)$ is defined based on a sequence length $M_{sc}^{RS}$.

The base sequence having a length of $3N_{sc}^{RB}$ or more may be defined as follows.

With respect to $M_{sc}^{RS} \geq 3N_{sc}^{RB}$, the base sequence $\bar{r}_{u,v}(0), \ldots, \bar{r}_{u,v}(M_{sc}^{RS}-1)$ is given by the following Expression 2.

$$\bar{r}_{u,v}(n) = x_q(n \bmod N_{ZC}^{RS}), \ 0 \leq n < M_{sc}^{RS}, \quad \text{Expression 2}$$

where a q-th root Zadoff-Chu sequence may be defined by the following Expression 3.

$$x_q(m) = e^{-j\frac{\pi q m(m+1)}{N_{ZC}^{RS}}}, \ 0 \leq m \leq N_{ZC}^{RS} - 1, \quad \text{Expression 3}$$

where q satisfies the following Expression 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31, \quad \text{Expression 4}$$

where the length $N_{ZC}^{RS}$ of the Zadoff-Chue sequence is given by the largest prime number, thus satisfying $N_{ZC}^{RS} < M_{sc}^{RS}$.

A base sequence having a length of less than $3N_{sc}^{RB}$ may be defined as follows. First, for $M_{sc}^{RS} = N_{sc}^{RB}$ and $M_{sc}^{RS} = 2N_{sc}^{RB}$, the base sequence is given as shown in Expression 5.

$$\bar{r}_{u,v}(n) = e^{j\varphi(n)\pi/4}, \ 0 \leq n \leq M_{sc}^{RS} - 1,$$

Expression 5 where values φ(n) for $M_{sc}^{RS}=N_{sc}^{RB}$ and $M_{sc}^{RS}=2N_{sc}^{RB}$ are given by the following Table 1, respectively.

TABLE 1

| u | φ(0), . . . , φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | 1 | 1 | -1 | -1 | 3 | -3 | 1 | 3 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | -3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

RS hopping is described below.

The sequence group number u in a slot $n_s$ may be defined as shown in the following Expression 6 by a group hopping pattern $f_{gh}(n_s)$ and a sequence shift pattern $f_{ss}$.

$$u = (f_{gh}(n_s) + f_{ss}) \bmod 30, \quad \text{Expression 6}$$

where mod denotes a modulo operation.

17 different hopping patterns and 30 different sequence shift patterns are present. Sequence group hopping may be enabled or disabled by a parameter for activating group hopping provided by a higher layer.

Although the PUCCH and the PUSCH have the same hopping pattern, the PUCCH and the PUSCH may have different sequence shift patterns.

The group hopping pattern $f_{gh}(n_s)$ is the same for the PUSCH and the PUCCH and is given by the following Expression 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}, \quad \text{Expression 7}$$

where c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The definition of the sequence shift pattern $f_{ss}$ varies between the PUCCH and the PUSCH.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

The following is a description of sequence hopping.

Sequence hopping is applied only to an RS having a length of $M_{sc}^{RS} \geq 6N_{sc}^{RB}$.

For an RS having a length of $M_{sc}^{RS} < 6N_{sc}^{RB}$, a base sequence number v within a base sequence group is v=0.

For an RS having a length of $M_{sc}^{RS} \geq 6N_{sc}^{RB}$, a base sequence number v within a base sequence group in a slot $n_s$ is given by the following Expression 8.

$$v = \begin{cases} c(n_s) & \text{if group hopping is disabled and sequence hopping is enabled} \\ 0 & \text{otherwise} \end{cases}, \quad \text{Expression 8}$$

where c(i) denotes a pseudo-random sequence and a parameter for enabling sequence hopping provided by a higher layer determines whether or not sequence hopping is possible. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined in the following manner.

The RS sequence $r^{PUSCH}(\cdot)$ for the PUCCH is defined as $r^{PUSCH}(m \cdot M_{sc}^{RS} + n) = r_{u,v}^{(\alpha)}(n)$. Here, m and n satisfy $$m = 0, 1$$

$$n = 0, \ldots, M_{sc}^{RS} - 1$$

and satisfy $M_{sc}^{RS} = M_{sc}^{PUSCH}$.

A cyclic shift in one slot is given by $\alpha = 2\pi n_{cs}/12$ together with $n_{cs} = (n_{DMRS}^{(1)} + n_{DMRS}^{(2)} + n_{PRS}(n_s)) \bmod 12$.

Here, $n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is given by $n_{PRS}(n_s) = \sum_{i=0}^{7} c(8 \cdot n_s + i) \cdot 2^i$.

c(i) is a pseudo-random sequence and c(i) is also a cell-specific value. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |

TABLE 3-continued

| Cyclic shift field at DCI format 0 | $n_{DMRS}^{(2)}$ |
|---|---|
| 110 | 9 |
| 111 | 10 |

A physical mapping method for a UL RS at a PUSCH is as follows.

A sequence is multiplied by an amplitude scaling factor $\beta_{PUSCH}$ and is mapped to the same physical resource block (PRB) set used for the corresponding PUSCH within the sequence that starts at $r^{PUSCH}(0)$. When the sequence is mapped to a resource element (k,l) (l=3 for a normal CP and l=2 for an extended CP) within a subframe, the order of k is first increased and the slot number is then increased.

In summary, a ZC sequence is used along with cyclic extension if the length is greater than or equal to $3N_{sc}^{RB}$ and a computer-generated sequence is used if the length is less than $3N_{sc}^{RB}$. The cyclic shift is determined according to a cell-specific cyclic shift, a UE-specific cyclic shift, a hopping pattern, and the like.

Figure 12A:
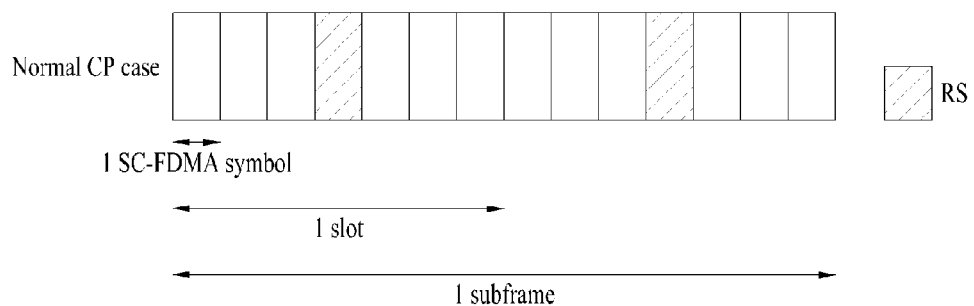
FIG. 12 illustrates the structure of a demodulation reference signal (DMRS) for a PUSCH.
Figure 12B:
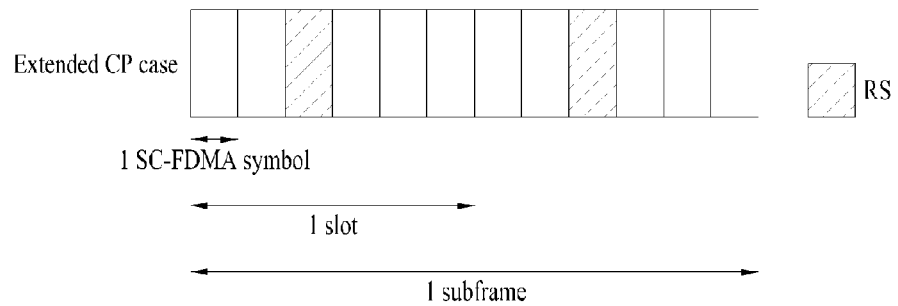

FIG. 12A illustrates the structure of a demodulation reference signal (DMRS) for a PUSCH in the case of normal CP and FIG. 12B illustrates the structure of a DMRS for a PUSCH in the case of extended CP. In the structure of FIG. 12A, a DMRS is transmitted through fourth and eleventh SC-FDMA symbols and, in the structure of FIG. 12B, a DMRS is transmitted through third and ninth SC-FDMA symbols.

FIGS. 13 to 16 illustrate a slot level structure of a PUCCH format. The PUCCH includes the following formats in order to transmit control information.

(1) Format 1: Used for on-off keying (OOK) modulation and scheduling request (SR) (2) Format 1a and Format 1b: Used for ACK/NACK transmission
  1) Format 1a: BPSK ACK/NACK for one codeword
  2) Format 1b: QPSK ACK/NACK for two codewords
(3) Format 2: Used for QPSK modulation and CQI transmission
(4) Format 2a and Format 2b: Used for CQI and ACK/NACK simultaneous transmission.

Table 4 shows a modulation scheme and the number of bits per subframe according to PUCCH format. Table 5 shows the number of RSs per slot according to PUCCH format. Table 6 shows SC-FDMA symbol locations of an RS according to PUCCH format. In Table 4, the PUCCH formats 2a and 2b correspond to the case of normal CP.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA symbol location of RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 13:
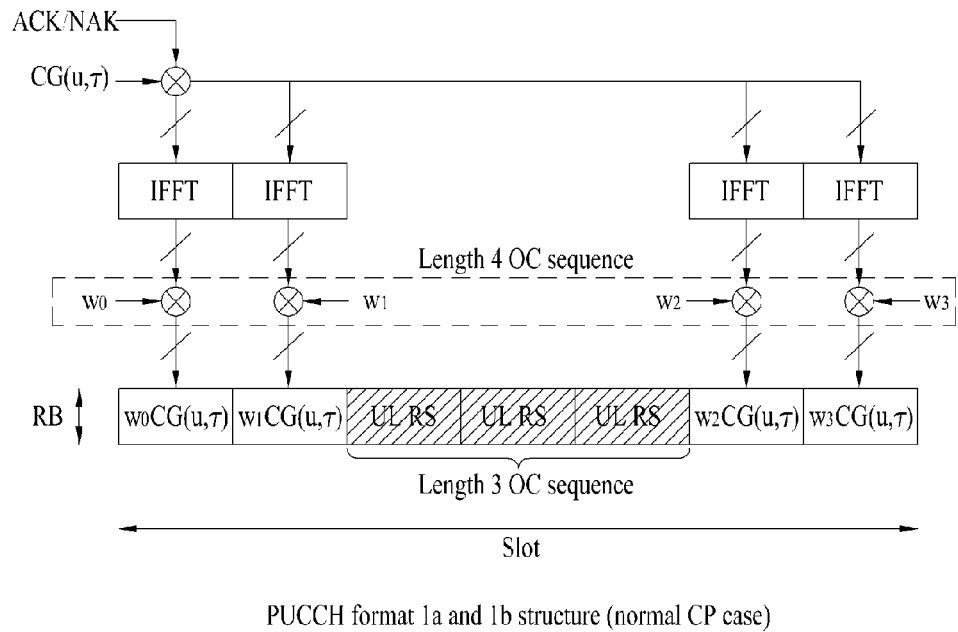
FIGS. 13 and 14 illustrate a slot level structure of PUCCH formats 1a and 1b.
Figure 14:
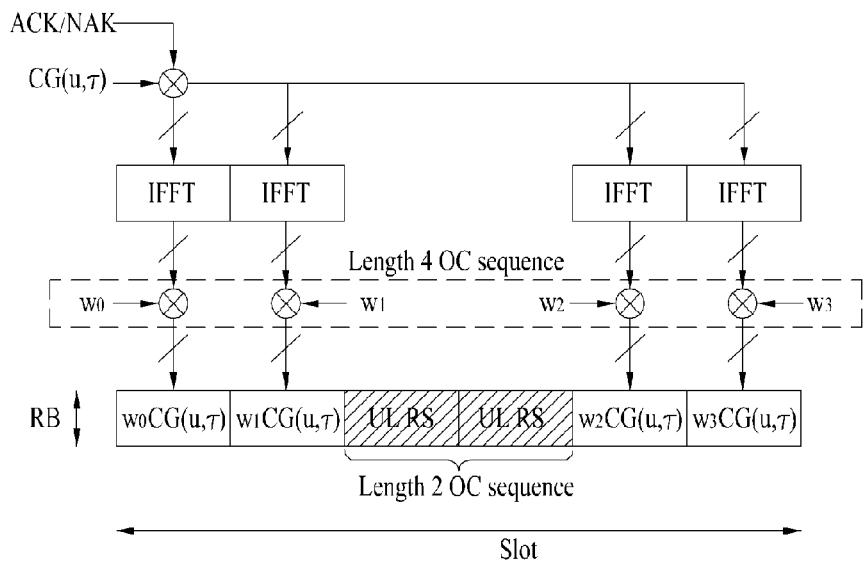

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PUCCH corresponding to the PDSCH.

Figure 15:
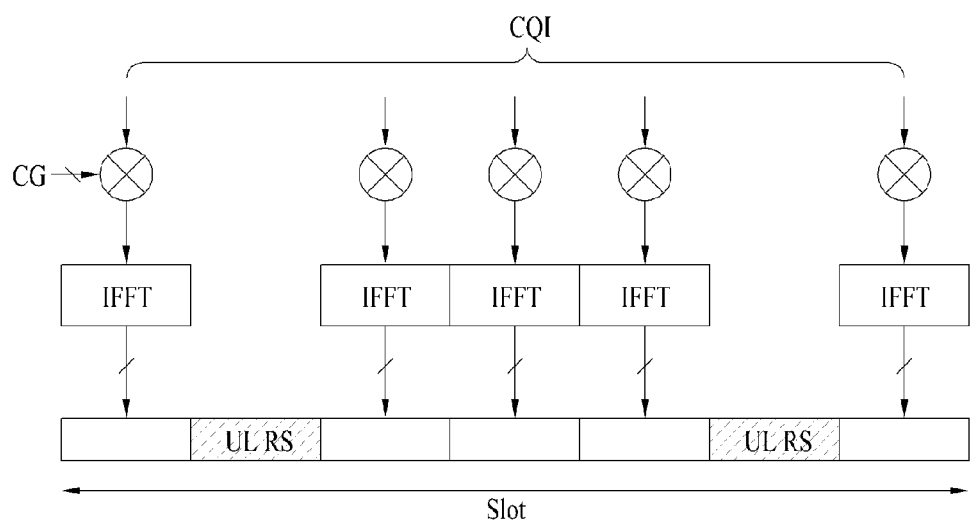
FIGS. 15 and 16 illustrate a slot level structure of PUCCH formats 2/2a/2b.
Figure 16:
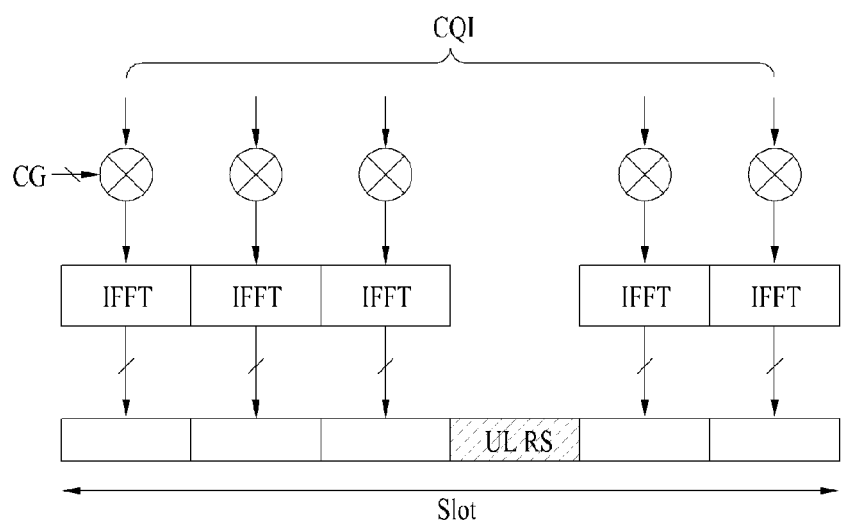

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1b are shown in the following Tables 4 and 5.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The orthogonal sequences (OCs) for the RS in the PUCCH formats 1/1a/1b are shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b when $\Delta_{shift}^{PUCCH}=2$.

Figure 18:
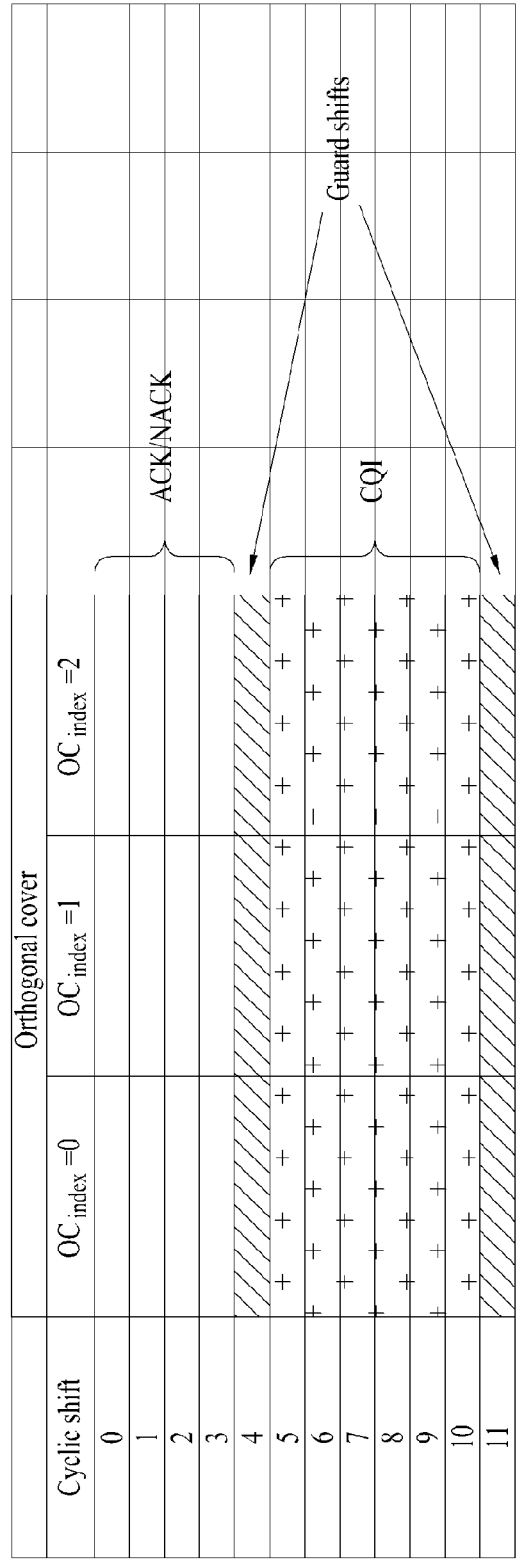
FIG. 18 illustrates channelization of a structure in which PUCCH formats 1a/1b and PUCCH formats 2/2a/2b are mixed within the same PRB.

FIG. 18 illustrates channelization of a structure in which PUCCH formats 1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping
1) For inter-cell interference randomization
2) Slot-based access for mapping between ACK/NACK channels and resources (k)

A resource $n_r$ for PUCCH formats 1/1a/1b includes the following combination.

(1) CS (=DFT OC in a symbol level) ($n_{cs}$)
(2) OC (OC in a slot level) ($n_{oc}$)
(3) Frequency RB ($n_{rb}$)

When indices representing the CS, the OC and the RB are $n_{cs}$, $n_{oc}$ and $n_{rb}$, a representative index nr includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a/2b. Here, Reed Muller (RM) channel coding may be applied.

For example, in the LTE system, channel coding for a UL CQI is described as follows. A bit stream $a_0$, $a_1$, $a_2$, $a_3$, ..., $a_{A-1}$ is channel-coded using a (20, A) RM code. Table 10 shows a base sequence for the (20, A) code. $\alpha_0$ and $\alpha_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the coded bits. Before QPSK modulation, the coded bits may be scrambled.

Channel coding bits $b_0$, $b_1$, $b_2$, $b_3$, ..., $b_{B-1}$ may be generated by Expression 9.

$$b_i = \sum_{n=0}^{A-1} (a_n \cdot M_{i,n}) \bmod 2, \quad \text{Expression 9}$$

where i=0, 1, 2, ..., B−1.

Table 11 shows an uplink control information (UCI) field for broadband reporting (single antenna port, transmit diversity or open loop spatial multiplexing PDSCH) CQI feedback.

TABLE 11

| Field | Bandwidth |
|---|---|
| Wideband CQI | 4 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband reporting.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 13

| Field | Bit widths | | |
|---|---|---|---|
| | 2 antenna ports | 4 antenna ports | |
| | | Up to two layers | Up to four layers |
| RI (Rank Indication) | 1 | 1 | 2 |

Figure 19:
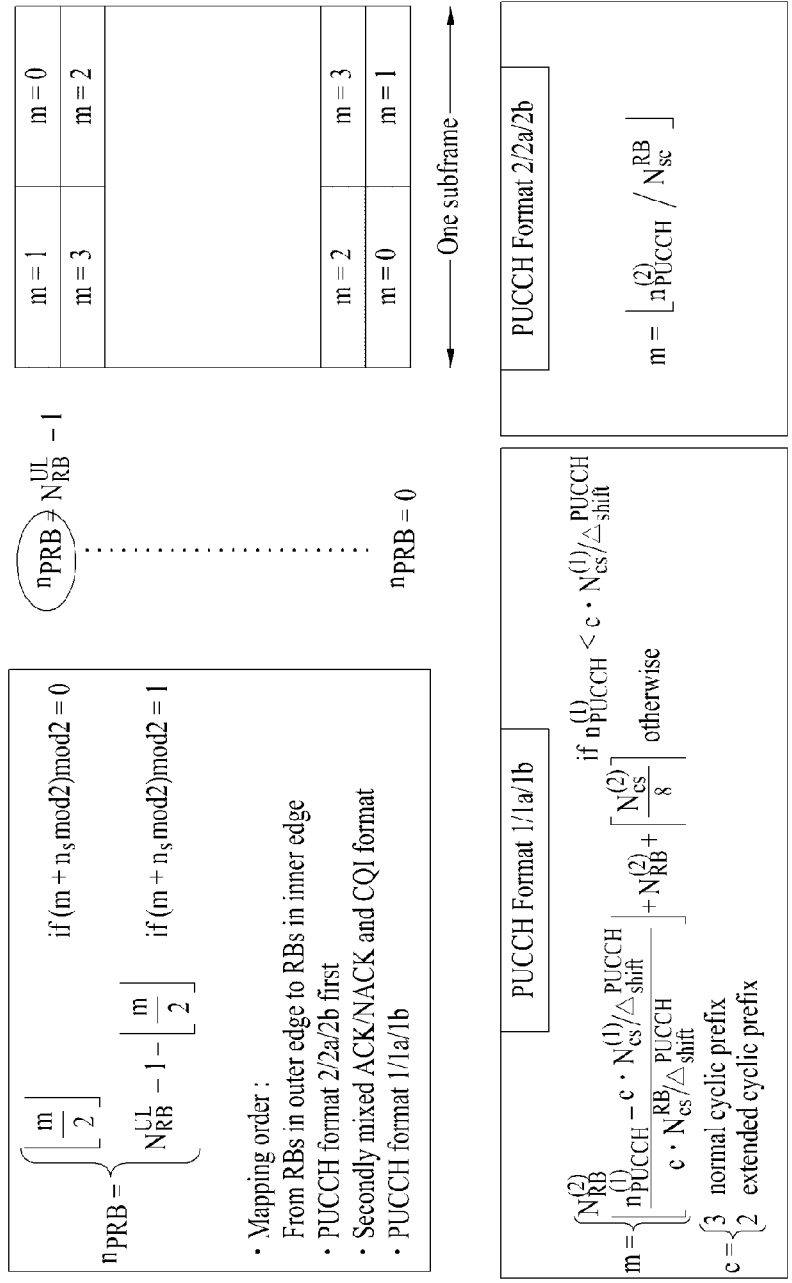
FIG. 19 illustrates PRB allocation for PUCCH transmission.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "multi-carrier" may be used interchangeably with the terms "carrier aggregation" and "bandwidth aggregation". The term "carrier aggregation" may refer to both contiguous carrier aggregation and non-contiguous carrier aggregation.

Figure 20:
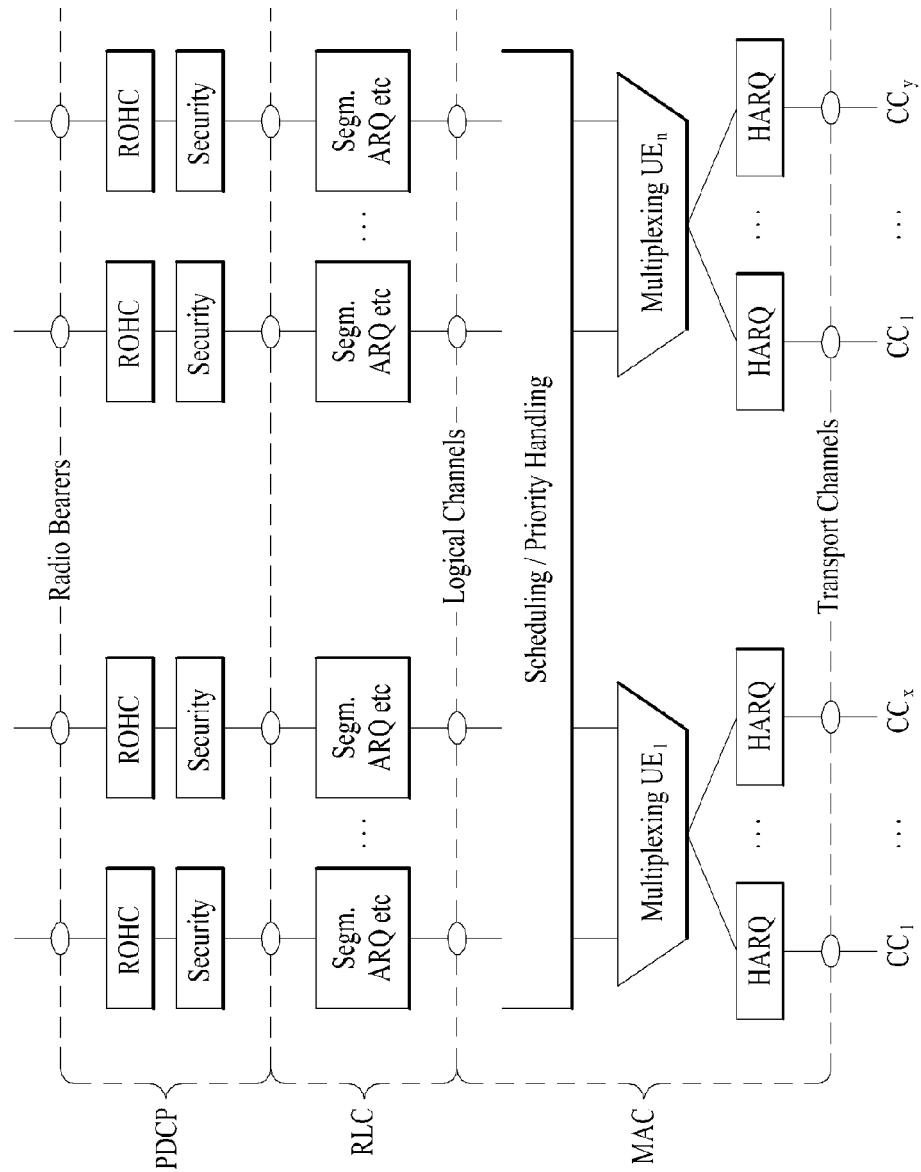
FIG. 20 is a conceptual diagram illustrating management of downlink component carriers in a base station (BS).
Figure 21:
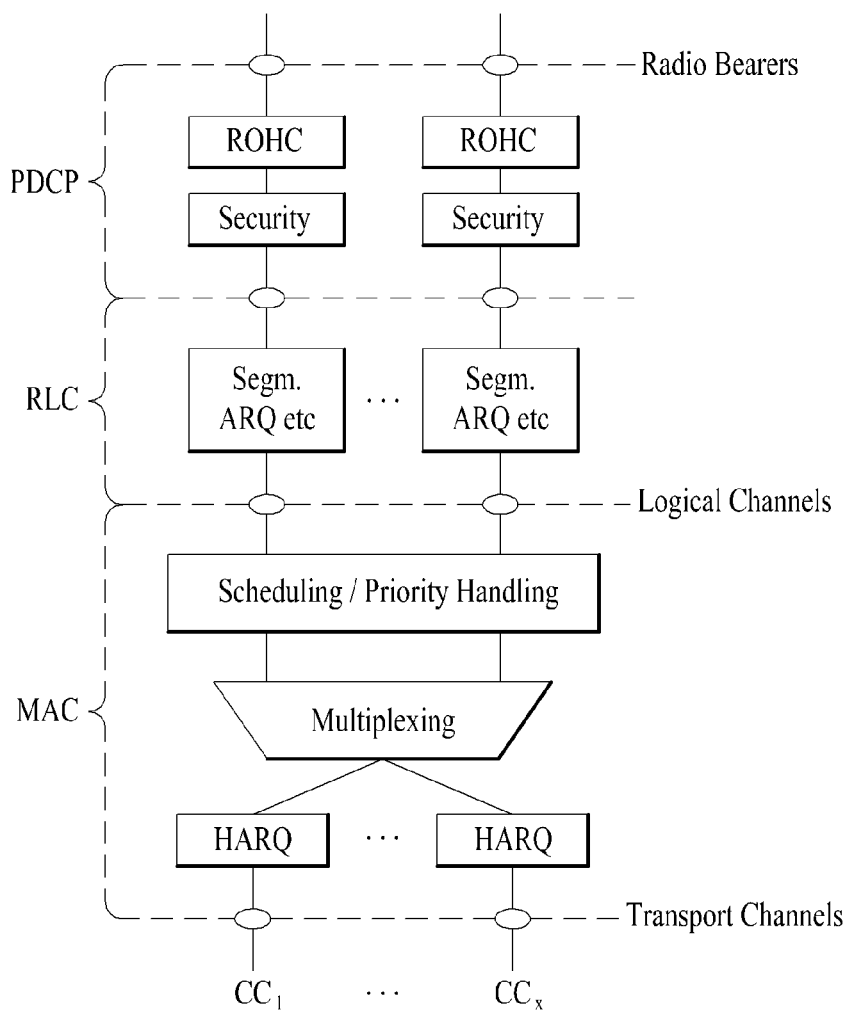
FIG. 21 is a conceptual diagram illustrating management of uplink component carriers in a user equipment (UE).

FIG. 20 is a conceptual diagram illustrating management of downlink component carriers (DL CCs) in a base station (BS) and FIG. 21 is a conceptual diagram illustrating management of uplink component carriers (UL CCs) in a user equipment (UE). For ease of explanation, the higher layer is simply described as a MAC (or a MAC entity) in the following description of FIGS. 20 and 21.

Figure 22:
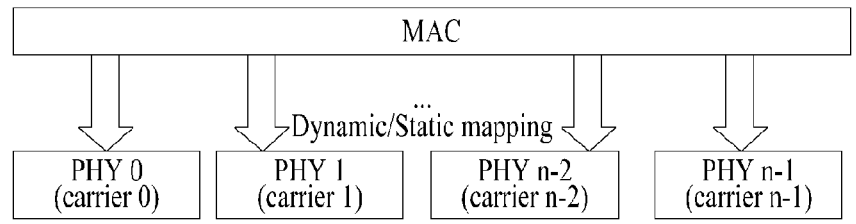
FIG. 22 is a conceptual diagram illustrating management of multiple carriers by one MAC entity in a BS.
Figure 23:
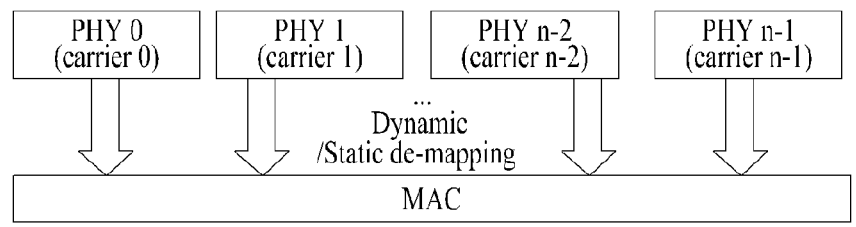
FIG. 23 is a conceptual diagram illustrating management of multiple carriers by one MAC entity in a UE.

FIG. 22 is a conceptual diagram illustrating management of multiple carriers by one MAC entity in a BS. FIG. 23 is a conceptual diagram illustrating management of multiple carriers by one MAC entity in a UE.

As shown in FIGS. 22 and 23, one MAC manages and operates one or more frequency carriers to perform transmission and reception. Frequency carriers managed by one MAC need not be contiguous and as such they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
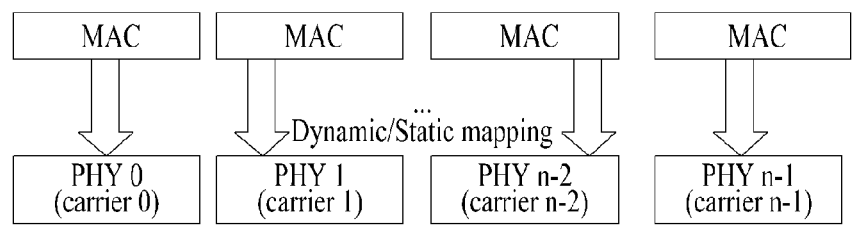
FIG. 24 is a conceptual diagram illustrating management of multiple carriers by a plurality of MAC entities in a BS.
Figure 25:
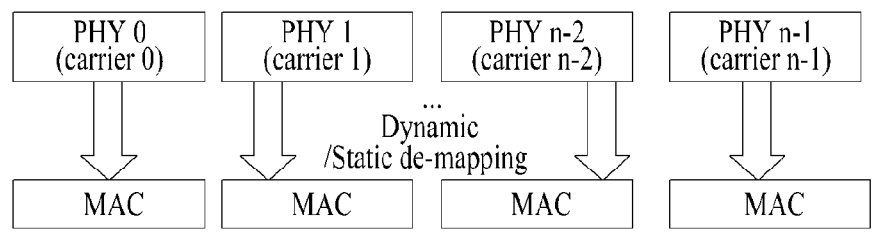
FIG. 25 is a conceptual diagram illustrating management of multiple carriers by a plurality of MAC entities in a UE.
Figure 26:
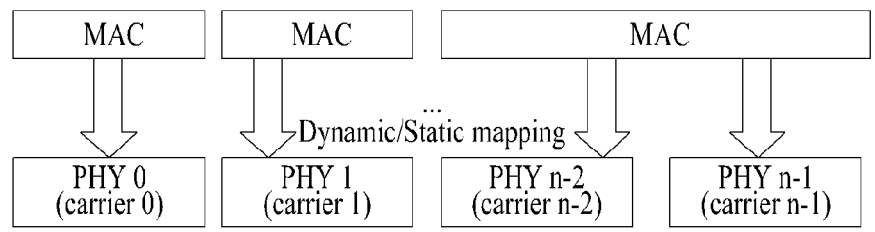
FIG. 26 is a conceptual diagram illustrating management of multiple carriers by a plurality of MAC entities in a BS.
Figure 27:
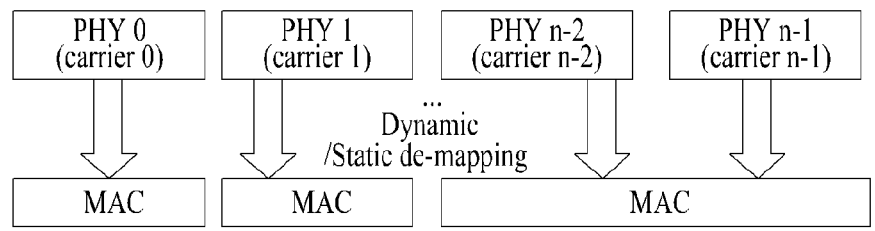
FIG. 27 is a conceptual diagram illustrating management of multiple carriers by a plurality of MAC entities in a UE when the UE receives the carriers.

FIG. 24 is a conceptual diagram illustrating management of multiple carriers by a plurality of MAC entities in a BS. FIG. 25 is a conceptual diagram illustrating management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Hereinafter, it is assumed for ease of explanation description that, when a PDCCH is transmitted through DL component carrier #0, a PDSCH corresponding to the PDCCH is transmitted through DL component carrier #0. However, it is apparent that cross-carrier scheduling may be applied such that the PDSCH is transmitted through a different DL component carrier. The term "component carrier" may be replaced with other equivalent terms (e.g., cell).

Figure 28:
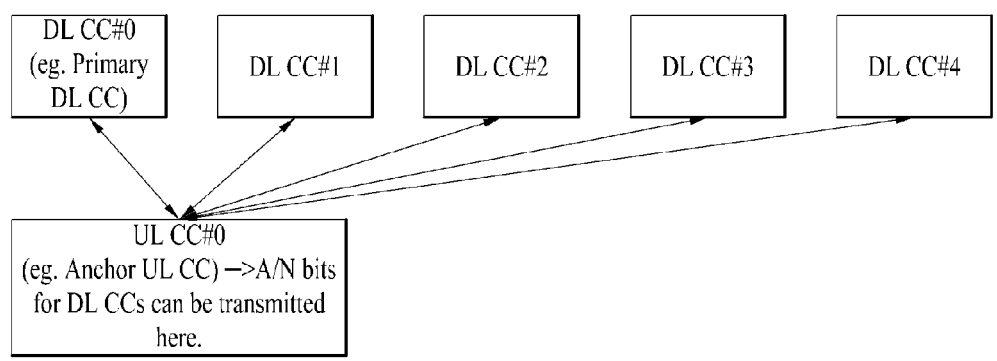
FIG. 28 illustrates an asymmetric carrier aggregation in which 5 DL CCs and one UL CC are linked.

FIG. 28 shows a scenario in which uplink control information (UCI) is transmitted in a radio communication system supporting CA. For ease of explanation, it is assumed in this example that the UCI is ACK/NACK (A/N). However, the UCI may include control information such as channel state information (CSI) (e.g., CQI, PMI, RI, etc.) or scheduling request information (e.g., SR, etc.).

FIG. 28 shows asymmetric carrier aggregation in which 5 DL CCs and one UL CC are linked. The illustrated asymmetric carrier aggregation may be set from the viewpoint of UCI transmission. That is, a DL CC-UL CC linkage for UCI and a DL CC-UL CC linkage for data may be set differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs.

A DL primary CC may be defined as a DL CC linked with a UL primary CC. Here, linkage includes implicit and explicit linkage. In LTE, one DL CC and one UL CC are uniquely paired. For example, a DL CC that is linked with a UL primary CC by LTE pairing may be referred to as a DL primary CC. This may be regarded as implicit linkage. Explicit linkage indicates that a network configures the linkage in advance and may be signaled by RRC or the like. In explicit linkage, a DL CC that is paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. The DL primary CC may also be configured through higher layer signaling. The DL primary CC may be a DL CC in which a UE performs initial access. DL CCs other than the DL primary CC may be referred to as DL secondary CCs. Similarly, UL CCs other than the UL primary CC may be referred to as UL secondary CCs.

LTE-A uses the concept of the cell to manage wireless resources. The cell is defined as a combination of DL resources and UL resources. Here, UL resources are optional. Therefore, the cell may be composed of only DL resources or may be composed of DL resources and UL resources. When carrier aggregation is supported, a linkage between a DL resource carrier frequency (or DL CC) and a UL resource carrier frequency (or UL CC) may be indicated by system information. A cell that operates with the primary frequency (or PCC) may be referred to as a primary cell (PCell), and a cell that operates with a secondary frequency (or SCC) may be referred to as a secondary cell (SCell). A DL CC and a UL CC may be referred to respectively as a DL cell and a UL cell. In addition, an anchor (or primary) DL CC and an anchor (or primary) UL CC may be referred to respectively as a DL Primary Cell (PCell) and a UL PCell. The PCell may be used when a UE performs an initial connection establishment process or a connection re-establishment process. PCell may also indicate a cell indicated in a handover procedure. The SCell may be configured after an RRC connection establishment is performed and may be used to provide additional wireless resources. PCell and SCell may be collectively referred to as a serving cell. Therefore, in the case of a UE for which a carrier aggregation has not been set or which does not support carrier aggregation although the UE is in an RRC_CONNECTED state, only one serving cell, which consists of only a PCell, is present. On the other hand, in the case of a UE which is in an RRC_CONNECTED state and for which a carrier aggregation has been set, one or more serving cells are present and one PCell and all SCells are included in the serving cells. To support carrier aggregation, after an initial security activation process is started, the network may construct one or more SCells in addition to a PCell, which is constructed in a connection establishment procedure, for a UE which supports carrier aggregation.

DL-UL may correspond only to FDD. DL-UL pairing may not be defined for TDD since TDD uses the same frequency. In addition, a DL-UL linkage may be determined from a UL linkage through UL E-UTRA Absolute Radio Frequency Channel Number (EARFCN) of SIB2. For example, the DL-UL linkage may be acquired through SIB2 decoding when initial access is performed and may be acquired through RRC signaling otherwise. Accordingly, only the SIB2 linkage may be present and other DL-UL pairing may not be defined. For example, in the 2DL:1UL structure of FIG. 28, DL CC #0 and UL CC #0 may be in an SIB2 linkage relation with each other and other DL CCs may be in an SIB2 linkage relation with other UL CCs which have not been set for the UE.

To support the scenario of FIG. 28, there is a need to adopt a new method. In the following description, a PUCCH format for feedback of UCI (for example, multiple A/N bits) in a communication system that supports CA is referred to as a CA PUCCH format (or PUCCH format 3). For example, PUCCH format 3 may be used to transmit A/N information (which may include a DTX state) corresponding to a PDSCH (or PDCCH) transmitted from multiple DL serving cells.

FIGS. 29A to 29F illustrate a structure of the PUCCH format 3 and a signal processing procedure for the same.

Figure 29A:
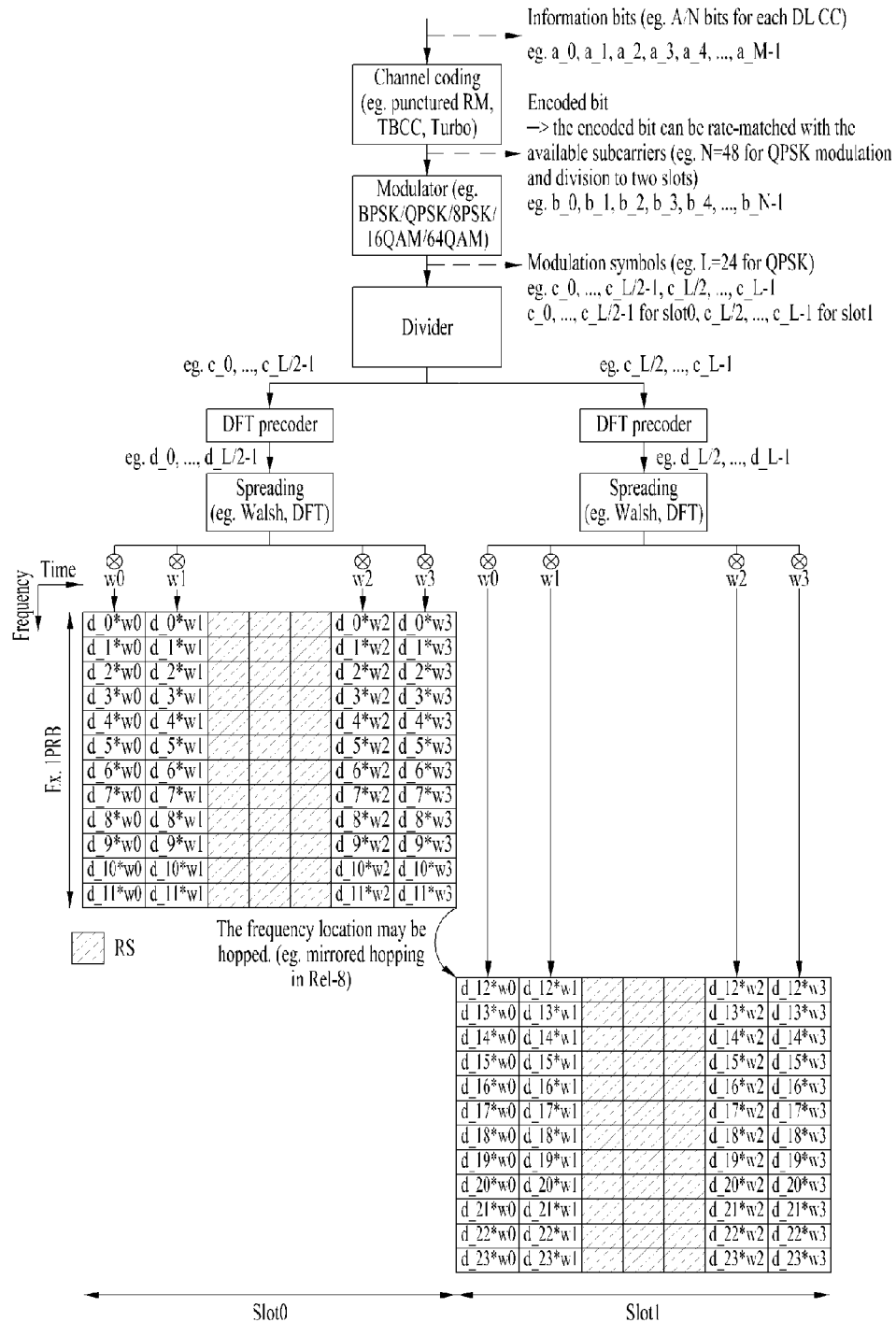
FIGS. 29A to 29F illustrate a structure of the PUCCH format 3 and a signal processing procedure for the same.

FIG. 29A illustrates a PUCCH format 3 structure that uses an orthogonal code (OC) of SF=4. As shown in FIG. 29, a channel coding block performs channel coding on information bits ($a\_0, a\_1, \ldots, a\_M-1$) (e.g., multiple ACK/NACK bits) to generate encoded bits (coded bits or coding bits) (or codeword) ($b\_0, b\_1, \ldots, b\_N-1$). Here, M represents the size of the information bits, and N represents the size of the coding bits. The information bits may include UCI, for example, multiple ACKs/NACKs for multiple data (or PDSCHs) received through multiple DL CCs. Here, the information bits ($a\_0, a\_1, \ldots, a\_M-1$) are joint-coded regardless of type, number, or size of UCIs that constitute the information bits. For example, when the information bits include multiple ACK/NACK data for a plurality of DL CCs, channel coding is not performed per DL CC or per ACK/NACK bit but is instead performed for the entire bit information, thereby generating a single codeword. Channel coding may include, without being limited to, simple repetition, simplex coding, Reed-Muller (RM) coding, punctured RM coding, tail-biting convolutional coding (TBCC), low-density parity-check (LDPC) or turbo-coding. Although not shown in the drawings, the encoded bits may be rate-matched taking into consideration modulation order and the amount of resources. The rate matching function may be incorporated into the channel coding block or may be performed through a separate functional block.

A modulator modulates the coded bits ($b\_0, b\_1, \ldots, b\_N-1$) to generate modulation symbols ($c\_0, c\_1, \ldots, c\_L-1$). L is the size of the modulation symbols. The modulation method is performed by modifying the size and phase of a transmission (Tx) signal. For example, the modulation method includes n-PSK (Phase Shift Keying), n-QAM (Quadrature Amplitude Modulation), where n is an integer greater than 1. Specifically, the modulation method may include Binary PSK (BPSK), Quadrature PSK (QPSK), 8-PSK, QAM, 16-QAM, 64-QAM, etc.

A divider distributes the modulation symbols ($c\_0, c\_1, \ldots, c\_L-1$) to slots. The order/pattern/scheme for distributing the modulation symbols to slots are not specifically limited. For example, the divider may sequentially distribute the modulation symbols to slots in order of increasing slot number (according to a localized scheme). In this case, as shown in the drawings, the modulation symbols ($c\_0, c\_1, \ldots, c\_L/2-1$) may be distributed to slot 0 and the modulation symbols ($c\_L/2, c\_L/2+1, \ldots, c\_L-1$) may be distributed to slot 1. In addition, the modulation symbols may be interleaved (or permuted) when they are distributed to slots. For example, even modulation symbols may be distributed to slot 0 and odd modulation symbols may be distributed to slot 1. The modulation process and the division process may be performed in reverse order.

A DFT precoder performs DFT precoding (e.g., 12-point DFT) on the modulation symbols distributed to slot 0 in order to generate a single carrier waveform. Referring to the drawings, the modulation symbols ($c\_0, c\_1, \ldots, c\_L/2-1$) distributed to slot 0 may be DFT-precoded into DFT symbols ($d\_0, d\_1, \ldots, d\_L/2-1$), and the modulation symbols ($c\_L/2, c\_L/2+1, \ldots, c\_L-1$) distributed to slot 1 may be DFT-precoded into DFT symbols (d_L/2, d_L/2+1, ..., d_L−1). DFT precoding may be replaced with a different linear operation (e.g., Walsh precoding).

A spreading block spreads the DFT-processed signal at an SC-FDMA symbol level (in the time domain). The time domain spreading at the SC-FDMA symbol level is performed using a spread code (or spread sequence). The spread code includes a quasi-orthogonal code and an orthogonal code. The quasi-orthogonal code may include, without being limited to, a Pseudo Noise (PN) code. The orthogonal code may include, without being limited to, a Walsh code and a DFT code. The term "Orthogonal Code (OC)" may be used interchangeably with "orthogonal sequence", "orthogonal Cover (OC)", or "orthogonal Cover Code (OCC)". Although this specification has been described with reference to the orthogonal code as a representative example of the spread code for ease of explanation, the orthogonal code may be replaced with a quasi-orthogonal code. The maximum value of the spread code size (or a spreading factor (SF)) is limited by the number of SC-FDMA symbols used for control information transmission. For example, when four SC-FDMA symbols are used to transmit control information in one slot, (pseudo) orthogonal codes (w0, w1, w2, w3) having a length of 4 may be used in each slot. SF indicates the spreading degree of control information and may be associated with UE multiplexing order or antenna multiplexing order. The SF may vary between 1, 2, 3, 4, ..., according to system requirements. The SF may be predefined between the BS and the UE or may be signaled to the UE through DCI or RRC signaling. For example, when one of the SC-FDMA symbols for control information is punctured to perform SRS transmission, a spread code with a reduced SF value (for example, an SF value of 3 rather than an SF value of 4) may be applied to control information of the corresponding slot.

The signal generated through the above-mentioned procedure may be mapped to subcarriers in the PRB and may then be converted into a time domain signal through an IFFT module. A CP is added to the time domain signal and the generated SC-FDMA symbol is transmitted through an RF unit.

Each procedure is described below in more detail on the assumption that ACK/NACK information for 5 DL CCs is transmitted. When each DL CC can transmit two PDSCHs, a corresponding ACK/NACK may be 12 bits provided that a DTX state is included. Assuming that QPSK modulation and time spreading of SF=4 are applied, the coding block size (after rate matching) may be 48 bits. The coded bits are modulated into 24 QPSK symbols and 12 QPSK symbols are distributed to each slot. In each slot, 12 QPSK symbols are converted into 12 DFT symbols through a 12-point DFT operation. 12 DFT symbols of each slot are spread and mapped to four SC-FDMA symbols using the spread code of SF=4 in the time domain. Since 12 bits are transmitted through 2 bits×12 subcarriers×8 SC-FDMA symbols, the coding rate is 0.0625 (=12/192). In the case of SF=4, up to four UEs may be multiplexed per PRB.

The signal processing procedure described with reference to FIG. 29A is only exemplary and the signal mapped to the PRB in FIG. 29A may be obtained using various equivalent signal processing procedures. The signal processing procedures equivalent to that of FIG. 29A are described below with reference to FIGS. 29B to 29G.

Figure 29B:
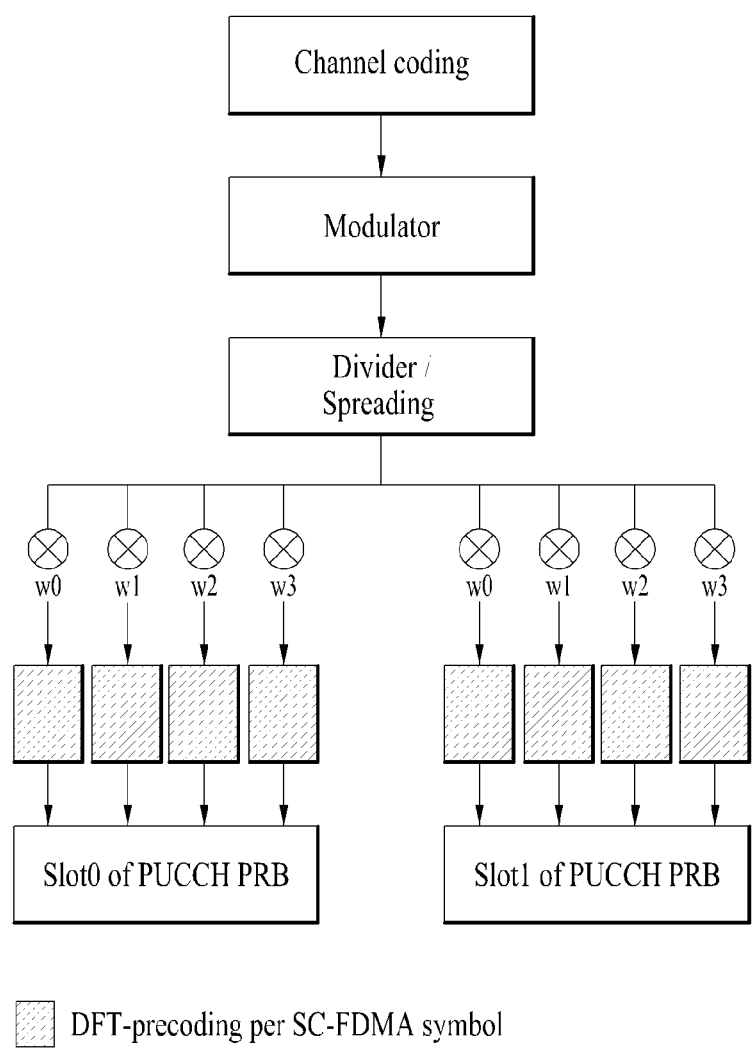

The signal processing procedure of FIG. 29B is different from that of FIG. 29A in the order in which the processes of the DFT precoder and the spreading block are performed. In FIG. 29A, the function of the spreading block is equivalent to multiplication of a DFT symbol stream output from the DFT precoder by a specific constant at an SC-FDMA symbol level and therefore the value of the signal mapped to the SC-FDMA symbols is equal even when the order of the processes of the DFT precoder and the spreading block is reversed. Accordingly, the signal processing procedure for PUCCH format 3 may be performed in order of channel coding, modulation, division, spreading, and DFT precoding. In this case, the division process and the spreading process may be performed by one functional block. For example, the modulation symbols may be spread at the SC-FDMA symbol level while being alternately divided to slots. In another example, when the modulation symbols are divided to slots, the modulation symbols are copied so as to correspond to the size of the spreading code and the modulation symbols may be multiplied respectively by the elements of the spreading code. Accordingly, the modulation symbol stream generated for each slot is spread to a plurality of SC-FDMA symbols at the SC-FDMA symbol level. Thereafter, the complex symbol stream corresponding to each SC-FDMA symbol is DFT-precoded on an SC-FDMA symbol basis.

Figure 29C:
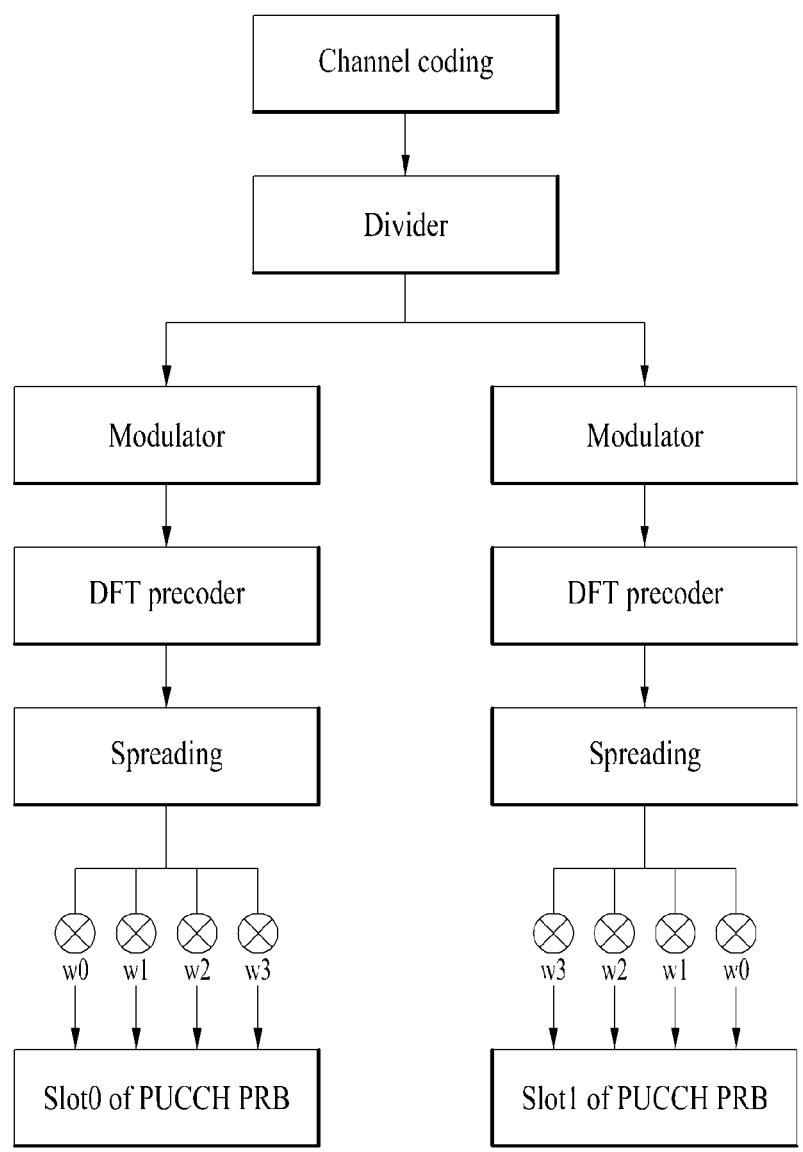

The signal processing procedure of FIG. 29C is different from that of FIG. 29A in the order in which the processes of the modulator and the divider are performed. Accordingly, the signal processing procedure for PUCCH format 3 may be performed in the order of joint channel coding and division at a subframe level and then modulation, DFT precoding and spreading at each slot level.

Figure 29D:
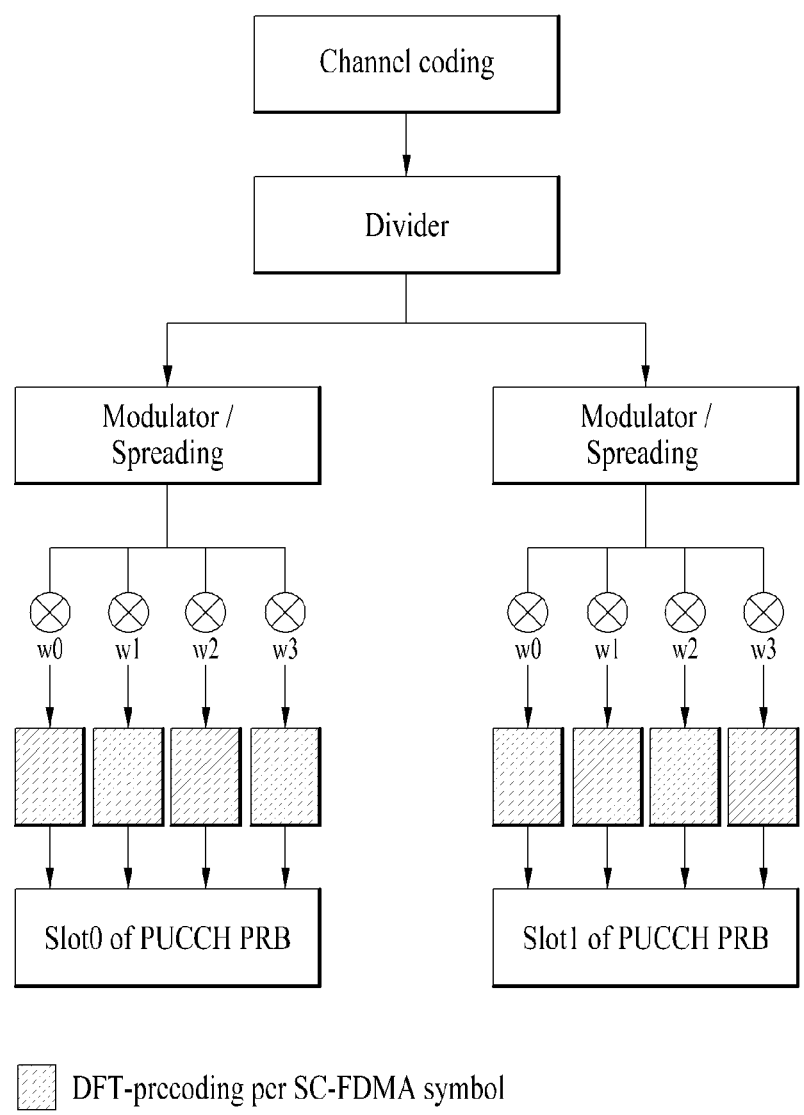

The signal processing procedure of FIG. 29D is different from that of FIG. 29C in the order in which the processes of the DFT precoder and the spreading block are performed. As described above, the function of the spreading block is equivalent to multiplication of a DFT symbol stream output from the DFT precoder by a specific constant at an SC-FDMA symbol level and therefore the value of the signal mapped to the SC-FDMA symbols is equal even when the order of the processes of the DFT precoder and the spreading block is reversed. Accordingly, the signal processing procedure for PUCCH format 3 is performed in the order of joint channel coding and division at the subframe level and then modulation at each slot level. The modulation symbol stream generated for each slot is spread to a plurality of SC-FDMA symbols at the SC-FDMA symbol level and the modulation symbol stream corresponding to each SC-FDMA symbol is DFT-precoded on an SC-FDMA symbol basis. In this case, the modulation process and the spreading process may be performed by one functional block. In one example, the generated modulation symbols may be directly spread at the SC-FDMA symbol level while the encoded bits are modulated. In another example, when the encoded bits are modulated and the modulation symbols, the modulation symbols are copied so as to correspond to the size of the spreading code and the modulation symbols may be multiplied respectively by the elements of the spreading code.

Figure 29E:
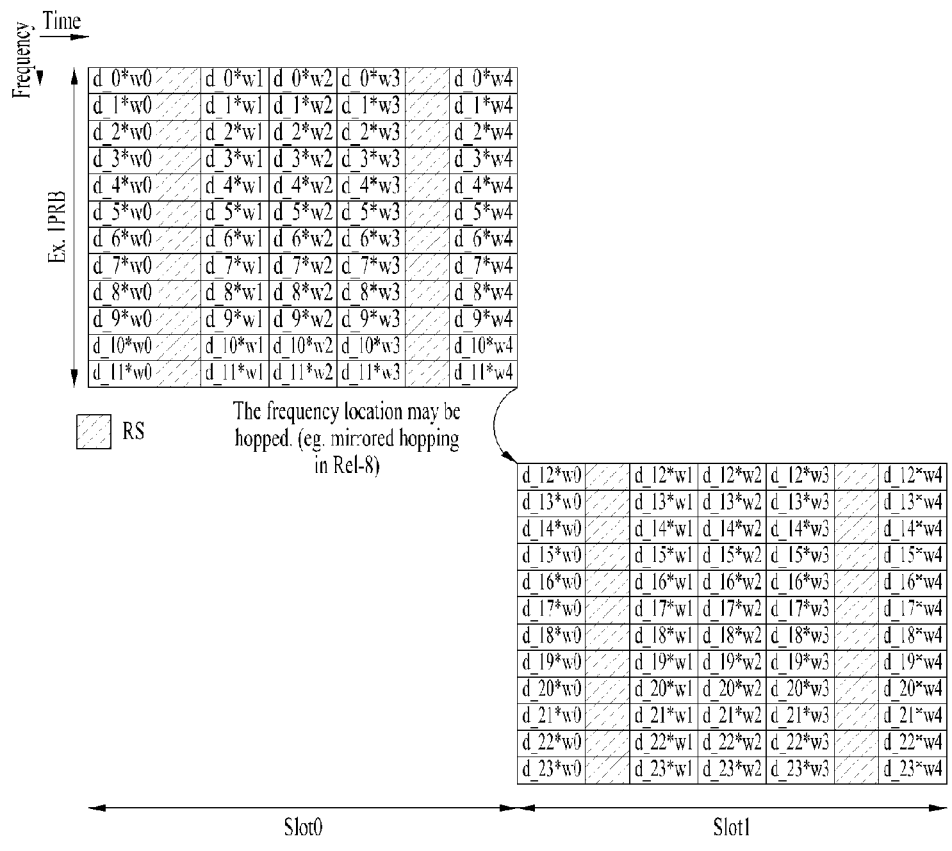
Figure 29F:
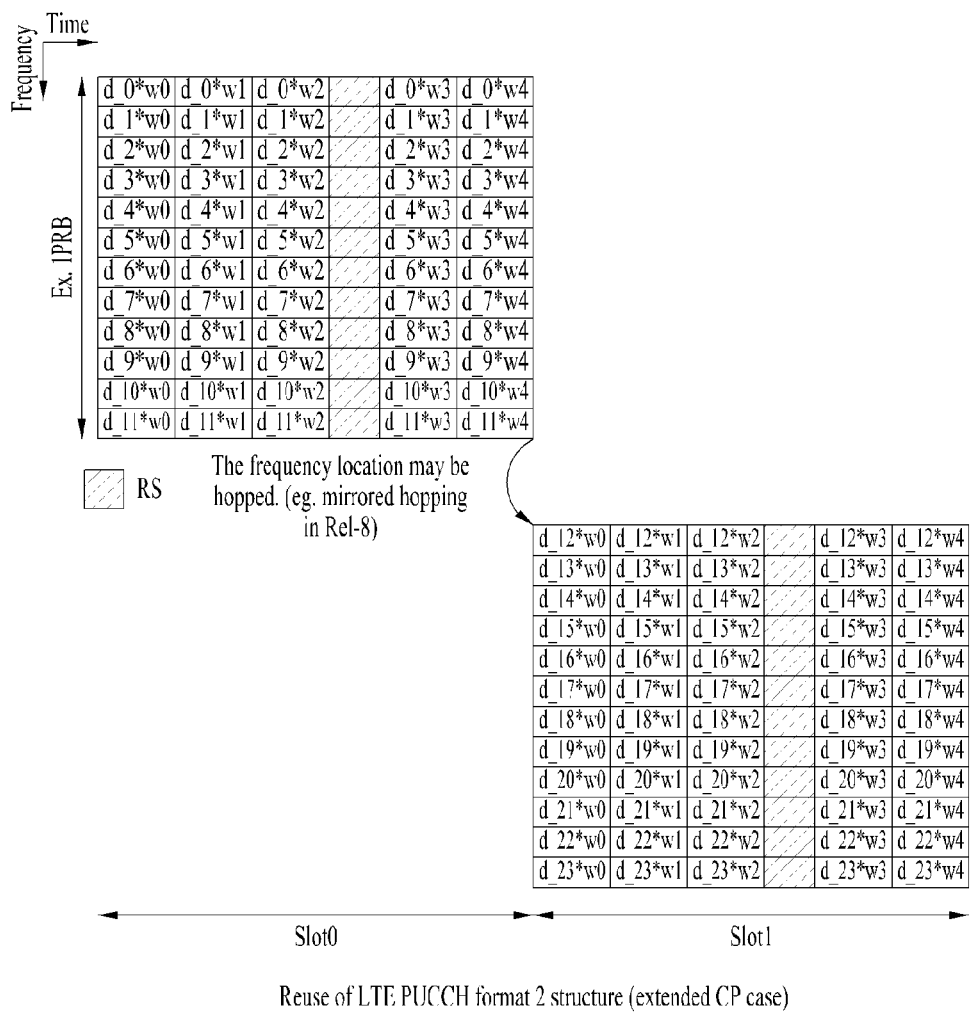

FIG. 29E shows the case in which the PUCCH format 3 is applied to the structure of PUCCH format 2 (normal CP) and FIG. 29F shows the case in which the PUCCH format 3 is applied to the structure of PUCCH format 2 (extended CP). The basic signal processing procedure is identical to those described with reference to FIGS. 29A to 29D. Since the structure of PUCCH format 2 of the conventional LTE is reused, the number/locations of UCI SC-FDMA symbols and RS SC-FDMA symbols in the PUCCH format 3 are different from those of FIG. 29A.

Table 14 shows the location of the RS SC-FDMA symbol in the shown PUCCH format 3. Here, it is assumed that the number of SC-FDMA symbols in a slot is 7 (indices 0 to 6) in the normal CP case and the number of SC-FDMA symbols in a slot is 6 (indices 0 to 5) in the extended CP case.

TABLE 14

| | SC-FDMA symbol location of RS | | |
|---|---|---|---|
| | Normal CP | Extended CP | Note |
| PUCCH format 3 | 2, 3, 4 | 2, 3 | PUCCH format 1 is reused |
| | 1, 5 | 3 | PUCCH format 2 is reused |

Here, the RS structure of the LTE system may be employed. For example, an RS sequence may be defined by cyclic shift (CS) of a basic sequence (see Expression 1).

The multiplexing capacity of the data part is 5 due to an SF value of 5 (SF=5). However, the multiplexing capacity of the RS part is determined according to a cyclic shift (CS) interval ($\Delta_{shift}^{PUCCH}$). Specifically, the multiplexing capacity is given as $$\frac{12}{\Delta_{shift}^{PUCCH}}.$$

For example, the multiplexing capacity is 12, 6, and 4 when $\Delta_{shift}^{PUCCH}=1$, $\Delta_{shift}^{PUCCH}=2$, and $\Delta_{shift}^{PUCCH}=3$, respectively. In FIGS. 29E to 29F, while the multiplexing capacity of the UCI data part is 5 due to the SF value of 5, the multiplexing capacity of the RS part is 4 when $\Delta_{shift}^{PUCCH}=3$. The entire multiplexing capacity is limited to 4 which is the smaller of the two capacity values 5 and 4.

Figure 30:
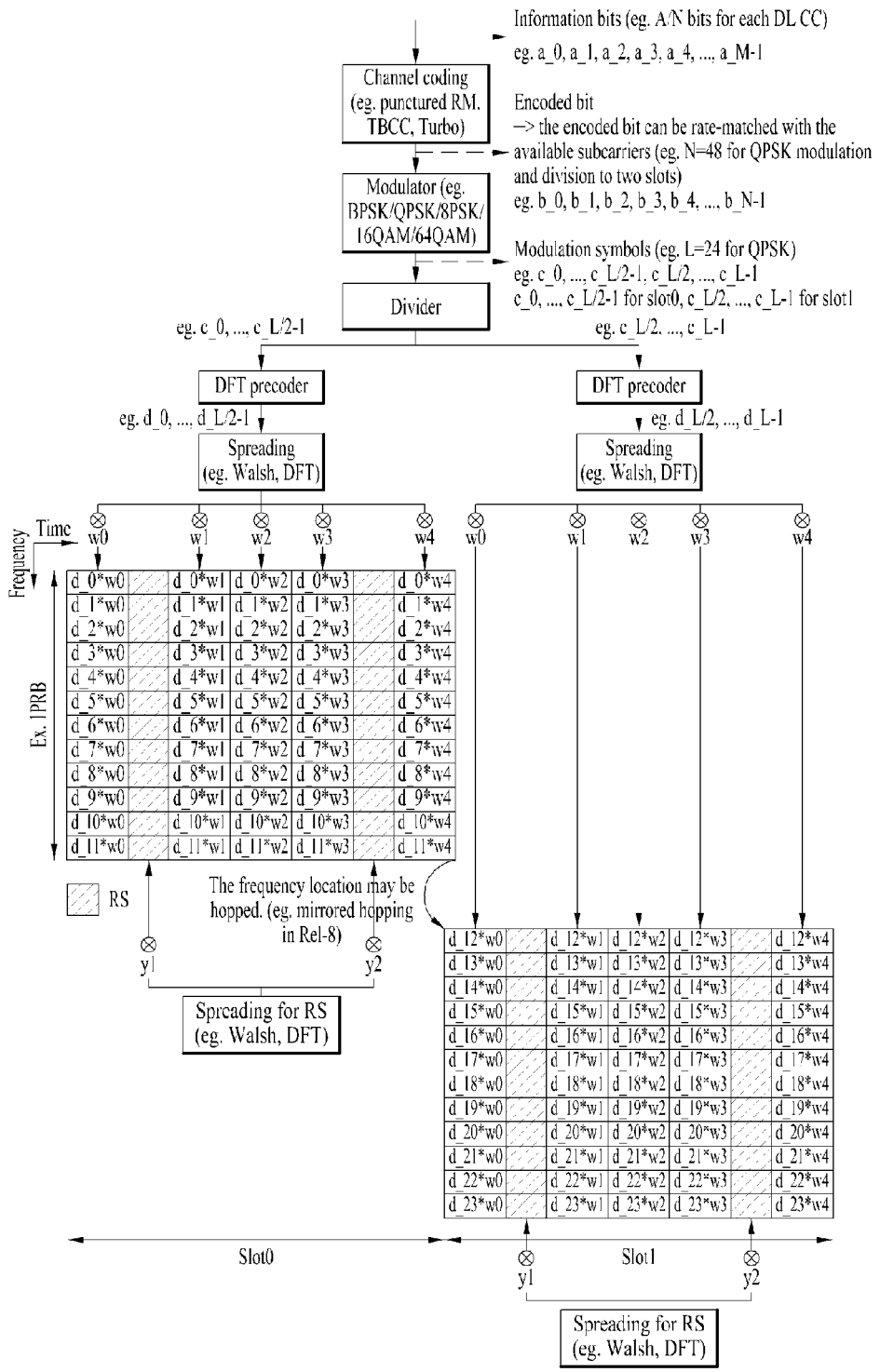
FIGS. 30 and 31 illustrate a PUCCH structure 3 with an increased multiplexing capacity and a signal processing procedure for the same.

FIG. 30 shows a PUCCH structure 3 with an increased multiplexing capacity. As shown in FIG. 30, SC-FDMA symbol level spreading is applied to a slot in the RS part. This doubles the multiplexing capacity of the RS part. That is, even when $\Delta_{shift}^{PUCCH}=3$, the multiplexing capacity of the RS part is 8 such that the multiplexing capacity of the UCI data part is not reduced. The orthogonal code cover for the RS includes, but is not limited to, a Walsh cover of [y1 y2]=[1 1], [1 −1] or a linearly transformed form (e.g., [j j] [j −j], [1 j][1 −j], etc.) thereof. y1 is applied to a first RS SC-FDMA symbol in the slot and y2 is applied to a second RS SC-FDMA symbol in the slot.

Figure 31:
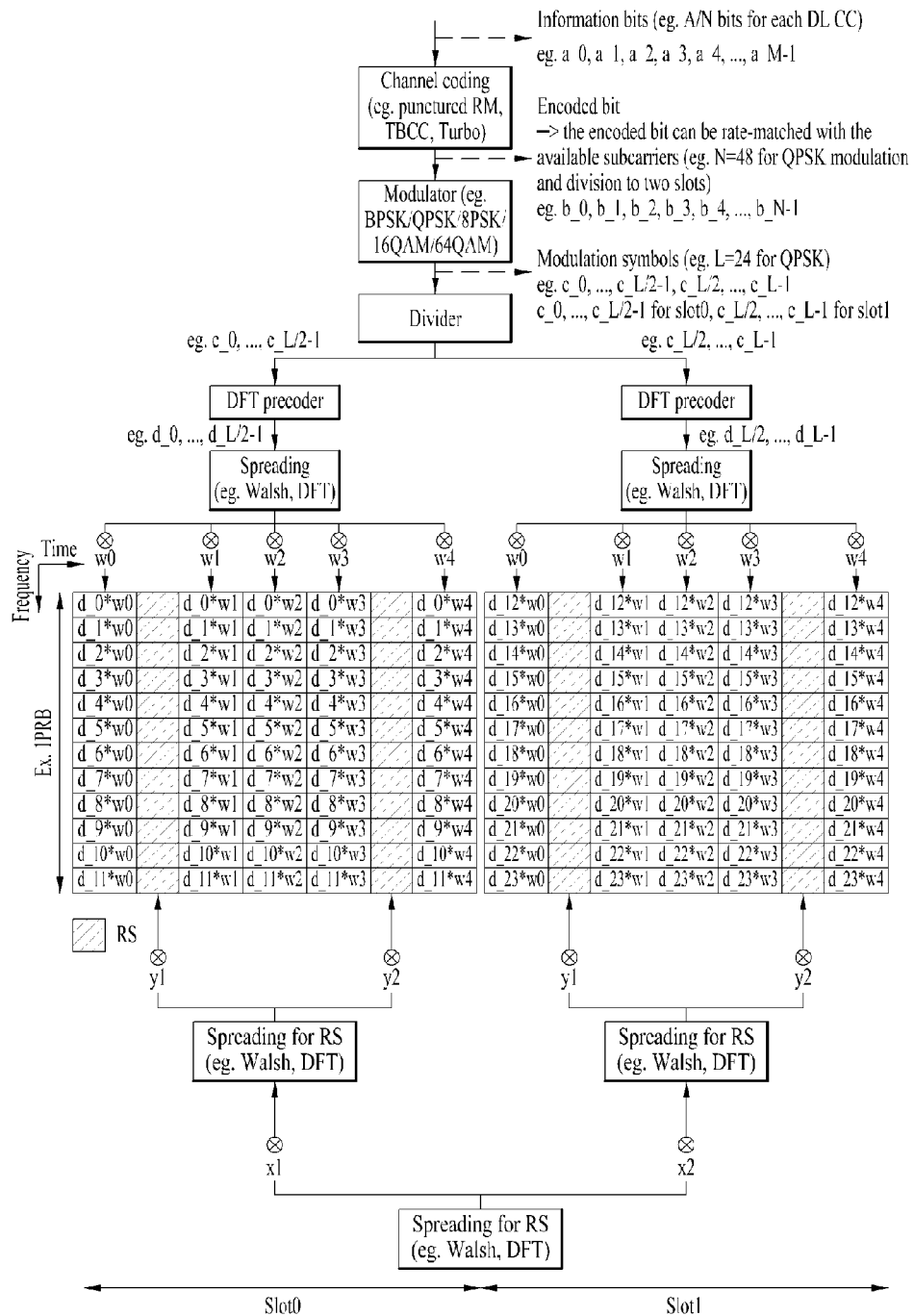

FIG. 31 shows another PUCCH structure 3 with an increased multiplexing capacity. If slot-level frequency hopping is not performed, spreading or covering (e.g., Walsh covering) may be additionally performed on a slot basis to double the multiplexing capacity. If Walsh covering is applied on a slot basis when slot-level frequency hopping is performed, orthogonality may be broken due to a difference between channel conditions of slots. The slot-based spreading code (e.g., orthogonal code cover) for the RS includes, but is not limited to, a Walsh cover of [x1 x2]=[1 1], [1 −1] or a linearly transformed form (e.g., [j j][j −j], [1 j][1 −j], etc.) thereof. x1 is applied to a first slot and x2 is applied to a second slot. Although the drawing illustrates that a slot-level spreading (or covering) process is performed and a spreading (or covering) process is then performed at an SC-FDMA symbol level, the processes may be performed in reverse order.

Figure 32:
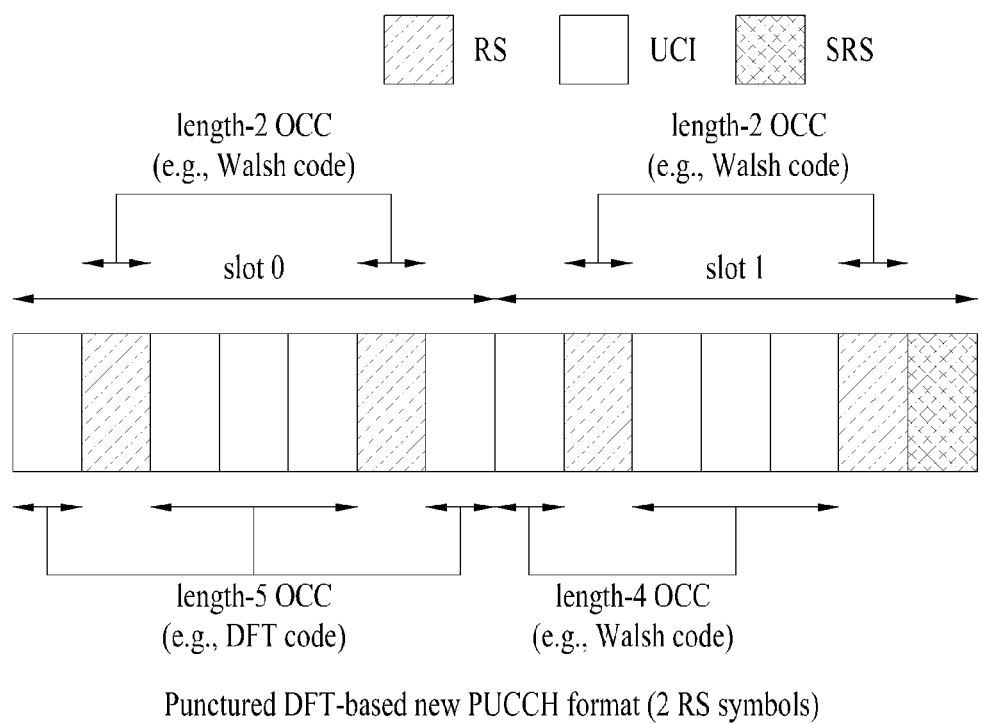
FIG. 32 illustrates a shortened PUCCH format 3.

FIG. 32 illustrates a shortened PUCCH format 3. A Sounding Reference Signal (SRS) is transmitted through a last SC-FDMA symbol of a subframe. Accordingly, when PUCCH format 3 is transmitted through a subframe in which SRS transmission has been set (i.e., through an SRS transmission subframe), the last SC-FDMA symbol of the subframe is not used for PUCCH transmission. The SRS transmission subframe may be given by cell-specific SRS configuration information and UE-specific SRS configuration information and may be specified by a period and an offset. The SRS transmission subframe includes a (UE-specific SRS transmission) subframe through which a UE transmits an SRS of the UE. In addition, the SRS transmission subframe may include a (cell-specific SRS transmission) subframe which can be used for SRS transmission in a cell, i.e., a subframe through which another UE can transmit an SRS. A UE-specific SRS transmission subframe set is included in a cell-specific SRS transmission subframe set.

Referring to FIG. 32, the structure of slot 0 is identical to the structure of normal PUCCH format 3 illustrated in FIGS. 29 to 31. On the other hand, the last SC-FDMA symbol of the slot 1 is not used for PUCCH transmission in order to protect SRS transmission. Specifically, although the number of RS symbols in slot 1 is 2, which is equal to that of slot 0, the number of UCI symbols is reduced from 5 to 4. Accordingly, the orthogonal sequence (or OCC) applied to the UCI symbol in slot 1 is reduced from 5 to 4. Although FIG. 32 illustrates that length-2 orthogonal sequence (or OCC) is applied to each slot, it is also possible that an orthogonal sequence (or OCC) is not applied to the RS symbol as illustrated in FIG. 29.

The signal processing procedure of the PUCCH format 3 is described below using mathematical expressions. For ease of explanation, it is assumed that length-5 OCC is used (as in the examples of FIGS. 29E to 32).

First, a bit block $b(0), \ldots, b(M_{bit}-1)$ is scrambled using a UE-specific scrambling sequence. The bit block $b(0), \ldots, b(M_{bit}-1)$ may correspond to coding bits b_0, b_1, \ldots, b_N−1 of FIG. 29A. The bit block $b(0), \ldots, b(M_{bit}-1)$ includes at least one of an ACK/NACK bit(s), CSI bit(s), and an SR bit. The scrambled bit block $\tilde{b}(0), \ldots, \tilde{b}(M_{bit}-1)$ may be generated according to the following expression.

$$\tilde{b}(i)=(b(i)+c(i))\bmod 2 \quad \text{Expression 10}$$

Here, c(i) denotes a scrambling sequence. c(i) includes a pseudo-random sequence defined by a length-31 gold sequence and may be generated according to the following Expression. "mod" denotes a modulo operation.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{Expression 11}$$

Here, $N_C=1600$. The 1st m-sequence is initialized as $x_1(0)=1, x_1(n)=0, n=1, 2, \ldots, 30$. The 2nd m-sequence is initialized as $c_{init}=\sum_{i=0}^{30} x_2(i) \cdot 2^i$. $c_{init}$ may be initialized as $c_{init}=(\lfloor n_s/2 \rfloor+1) \cdot (2N_{ID}^{cell}+1) \cdot 2^{16}+n_{RNTI}$ at the beginning of every cell subframe. $n_s$ is a slot number of a radio frame, $N_{ID}^{cell}$ is a physical layer cell identity, and $n_{RNTI}$ is a radio network temporary identifier.

The scrambled bit block $\tilde{b}(0), \ldots, \tilde{b}(M_{bit}-1)$ is modulated and a complex modulation symbol block $d(0), \ldots, d(M_{symb}-1)$ is generated. When QPSK modulation is performed, $M_{symb}=M_{bit}/2=2N_{sc}^{RB}$. The complex modulation symbol block d(0), . . . , d($M_{symb}$−1) corresponds to modulation symbols c_0, c_1, . . . , c_N−1 of FIG. 29A.

The complex modulation symbol block d(0), . . . , d($M_{symb}$−1) is spread in a block-wise manner using an orthogonal sequence $w_{n_{oc}}(i)$. $N_{SF,0}^{PUCCH}+N_{SF,1}^{PUCCH}$ complex symbol sets are generated according to the following expression. The division/spreading procedure of FIG. 29B is performed according to the following expression. Each complex symbol set corresponds to one SC-FDMA symbol and has $N_{sc}^{RB}$ (for example, 12) complex modulation values.

$$y_n^{(\tilde{p})}(i) = \qquad \text{Expression 12}$$

$$\begin{cases} w_{n_{oc,0}}^{(\tilde{p})}(\bar{n}) \cdot e^{j\pi\lfloor n_{cs}^{cell}(n_s,l)/64\rfloor/2} \cdot d(i) & n < N_{SF,0}^{PUCCH} \\ w_{n_{oc,1}}^{(\tilde{p})}(\bar{n}) \cdot e^{j\pi\lfloor n_{cs}^{cell}(n_s,l)/64\rfloor/2} \cdot d(N_{sc}^{RB} + i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Here, $N_{SF,0}^{PUCCH}$ and $N_{SF,1}^{PUCCH}$ correspond to the respective numbers of SC-FDMA symbols used for PUCCH transmission in slot 0 and slot 1. When the normal PUCCH format 3 is used, $N_{SF,0}^{PUCCH}=N_{SF,1}^{PUCCH}=5$. When the shortened PUCCH format 3 is used, $N_{SF,0}^{PUCCH}=5$ and $N_{SF,1}^{PUCCH}=4$. $w_{n_{oc,0}}^{(\tilde{p})}(i)$ and $w_{n_{oc,1}}^{(\tilde{p})}(i)$ represent respective orthogonal sequences applied to slot 0 and slot 1 and are given by the following Table 15. $n_{oc}^{(\tilde{p})}$ denotes an orthogonal sequence index (or an orthogonal code index). ⌊ ⌋ denotes a flooring function. $n_{cs}^{cell}(n_s,l)$ may be given by $n_{cs}^{cell}(n_s,l)=\Sigma_{i=0}^{7}c(8N_{symb}^{UL}\cdot n_s+8l+i)\cdot 2^i$. c(i) may be given by Expression 11 and may be initialized as $c_{init}=N_{ID}^{cell}$ at the beginning of every radio frame. $\tilde{p}$ is an index corresponding to an antenna port number.

Table 15 shows an orthogonal sequence $w_{n_{oc}}(i)$ according to a conventional scheme.

TABLE 15

| Sequence index $n_{oc}$ | Orthogonal sequence [$w_{n_{oc}}(0) \ldots w_{n_{oc}}(N_{SF}^{PUCCH}-1)$] | |
|---|---|---|
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

In Table 15, $N_{SF}^{PUCCH}=5$ orthogonal sequences (or codes) are generated according to the following expression.

$$\left[ e^{j\frac{2\pi\cdot 0\cdot n_{oc}}{5}} \; e^{j\frac{2\pi\cdot 1\cdot n_{oc}}{5}} \; e^{j\frac{2\pi\cdot 2\cdot n_{oc}}{5}} \; e^{j\frac{2\pi\cdot 3\cdot n_{oc}}{5}} \; e^{j\frac{2\pi\cdot 4\cdot n_{oc}}{5}} \right] \quad \text{Expression 13}$$

On the other hand, resources for PUCCH format 3 are identified by a resource index $n_{PUCCH}^{(3,\tilde{p})}$. For example, $n_{oc}^{(\tilde{p})}$ may be given by $n_{oc}^{(\tilde{p})}=n_{PUCCH}^{(3,\tilde{p})} \bmod N_{SF,1}^{PUCCH}$. $n_{PUCCH}^{(3,\tilde{p})}$ may be indicated through a Transmit Power Control (TPC) field of an SCell PDCCH. More specifically, $n_{oc}^{(\tilde{p})}$ for each slot may be given by the following expression.

$$n_{oc,0}^{(\tilde{p})} = n_{PUCCH}^{(3,\tilde{p})} \bmod N_{SF,1}^{PUCCH} \qquad \text{Expression 14}$$

$$n_{oc,1}^{(\tilde{p})} = \begin{cases} (3n_{oc,0}^{(\tilde{p})}) \bmod N_{SF,1}^{PUCCH} & \text{if } N_{SF,1}^{PUCCH} = 5 \\ n_{oc,0}^{(\tilde{p})} \bmod N_{SF,1}^{PUCCH} & \text{otherwise} \end{cases}$$

Here, $n_{oc,0}^{(\tilde{p})}$ represents a sequence index value ($n_{oc}^{(\tilde{p})}$) for slot 0 and $n_{oc,1}^{(\tilde{p})}$ represents a sequence index value ($n_{oc}^{(\tilde{p})}$) for slot 1. In the case of the normal PUCCH format 3, $N_{SF,0}^{PUCCH}=N_{SF,1}^{PUCCH}=5$. In the case of the shortened PUCCH format 3, $N_{SF,0}^{PUCCH}=5$ and $N_{SF,1}^{PUCCH}=4$.

According to the above Expression, in the case of the shortened PUCCH format 3 (i.e., $N_{SF,1}^{PUCCH}=4$), orthogonal sequences of the same index ($n_{oc,1}^{(\tilde{p})}$) are used for slot 0 and slot 1.

The block-spread complex symbol set may be cyclically shifted according to the following expression.

$$\tilde{y}_n^{(\tilde{p})}(i)=y_n^{(\tilde{p})}((i+n_{cs}^{cell}(n_s,l)) \bmod N_{sc}^{RB}) \quad \text{Expression 15}$$

Here, $n_s$ denotes a slot number in the radio frame and l denotes an SC-FDMA symbol number in the slot. $n_{cs}^{cell}(n_s,l)$ is defined as in Expression 12. In addition, n=0, . . . , $N_{SF,0}^{PUCCH}+N_{SF,1}^{PUCCH}-1$.

Each cyclic-shifted complex symbol set is transform-precoded according to the following expression. As a result, a complex symbol block $z^{(\tilde{p})}(0)$, . . . , $z^{(\tilde{p})}((N_{SF,0}^{PUCCH}+N_{SF,1}^{PUCCH})N_{sc}^{RB}-1)$ is generated.

$$z^{(\tilde{p})}(n\cdot N_{sc}^{RB}+k) = \frac{1}{\sqrt{P}}\frac{1}{\sqrt{N_{sc}^{RB}}}\sum_{i=0}^{N_{sc}^{RB}-1}\tilde{y}_n^{(\tilde{p})}(i)e^{-j\frac{2\pi ik}{N_{sc}^{RB}}} \quad \text{Expression 16}$$

$$k = 0, \ldots, N_{sc}^{RB} - 1$$

$$n = 0, \ldots, N_{SF,0}^{PUCCH} + N_{SF,1}^{PUCCH} - 1$$

The complex symbol block $z^{(\tilde{p})}(0)$, . . . , $z^{(\tilde{p})}((N_{SF,0}^{PUCCH}+N_{SF,1}^{PUCCH})N_{sc}^{RB}-1)$ is mapped to physical resources after power control. The PUCCH uses one resource block in each slot in a subframe. In the resource block, $z^{(\tilde{p})}(0)$, . . . , $z^{(\tilde{p})}((N_{SF,0}^{PUCCH}+N_{SF,1}^{PUCCH})N_{sc}^{RB}-1)$ are mapped to a resource element (k, j) on an antenna port p that is not used for RS transmission (see Table 14). Mapping is performed starting from the 1st slot and is then performed on slot k and then slot l and is then performed in increasing order of slot number. k denotes a subcarrier index and l denotes an SC-FDMA symbol index in the slot. P denotes the number of antenna ports used for PUCCH transmission. p denotes the antenna port number of an antenna used for PUCCH transmission and the following table shows a relationship between p and $\tilde{p}$.

TABLE 16

| | Antenna port number p (which is given by a function of P indicating the number of antenna ports configured for PUCCH) | | |
|---|---|---|---|
| Index $\tilde{p}$ | 1 | 2 | 4 |
| 0 | 100 | 200 | — |
| 1 | — | 201 | |

The PUCCH format 3 transmits block spread information at an SC-FDMA symbol level using orthogonal codes. However, according to the above method, the orthogonality performance of the orthogonal codes used for block spreading may be deteriorated when the UE moves at a high speed. This may reduce multiplexing capability and transmission reliability of the control information.

In the following, a method for improving the orthogonality performance of the PUCCH format 3 according to the present invention is described after the influence which a communication environment exerts upon the orthogonality performance of the orthogonal codes is described.

First, when a high speed environment is taken into consideration at $N_{SF}^{PUCCH}=4$, partial orthogonality should be maintained in order to efficiently maintain the orthogonality performance of the orthogonal codes. Partial orthogonality is orthogonality between some elements of the orthogonal codes. For example, partial orthogonality is orthogonality between the first two elements of the code of SF=4 or orthogonality between the last two elements. In a high speed environment, partial orthogonality of the code of SF=4 may be deteriorated for the following reason. For example, when orthogonal codes a=[+1 +1 +1 +1] and b=[+1 +1 −1 −1] which are mapped on an SC-FDMA symbol basis are taken into consideration, the two codes are orthogonal (i.e., a·bH=0). Channels between four SC-FDMA symbols should be static in order to completely maintain the orthogonality between the orthogonal codes. However, channels between SC-FDMA symbols may change in a high speed environment, which may deteriorate partial orthogonality and overall orthogonality performance of the orthogonal codes.

In addition, when a high speed environment is taken into consideration at $N_{SF}^{PUCCH}=5$, the robustness of the orthogonality between orthogonal codes increases as the distance between the indices $n_{oc}$ of the orthogonal codes increases. For example, the orthogonality between the orthogonal codes of $n_{oc}=0$ and $n_{oc}=1$ is more robust to the communication environment than the orthogonality between the orthogonal codes of $n_{oc}=0$ and $n_{oc}=3$. The orthogonal code indices $n_{oc}$ may be cyclic. For example, the robustness of the orthogonality between codes of $n_{oc}=0$ and 4 is equal to that of the orthogonality between codes of $n_{oc}=0$ and 1.

Figure 33:
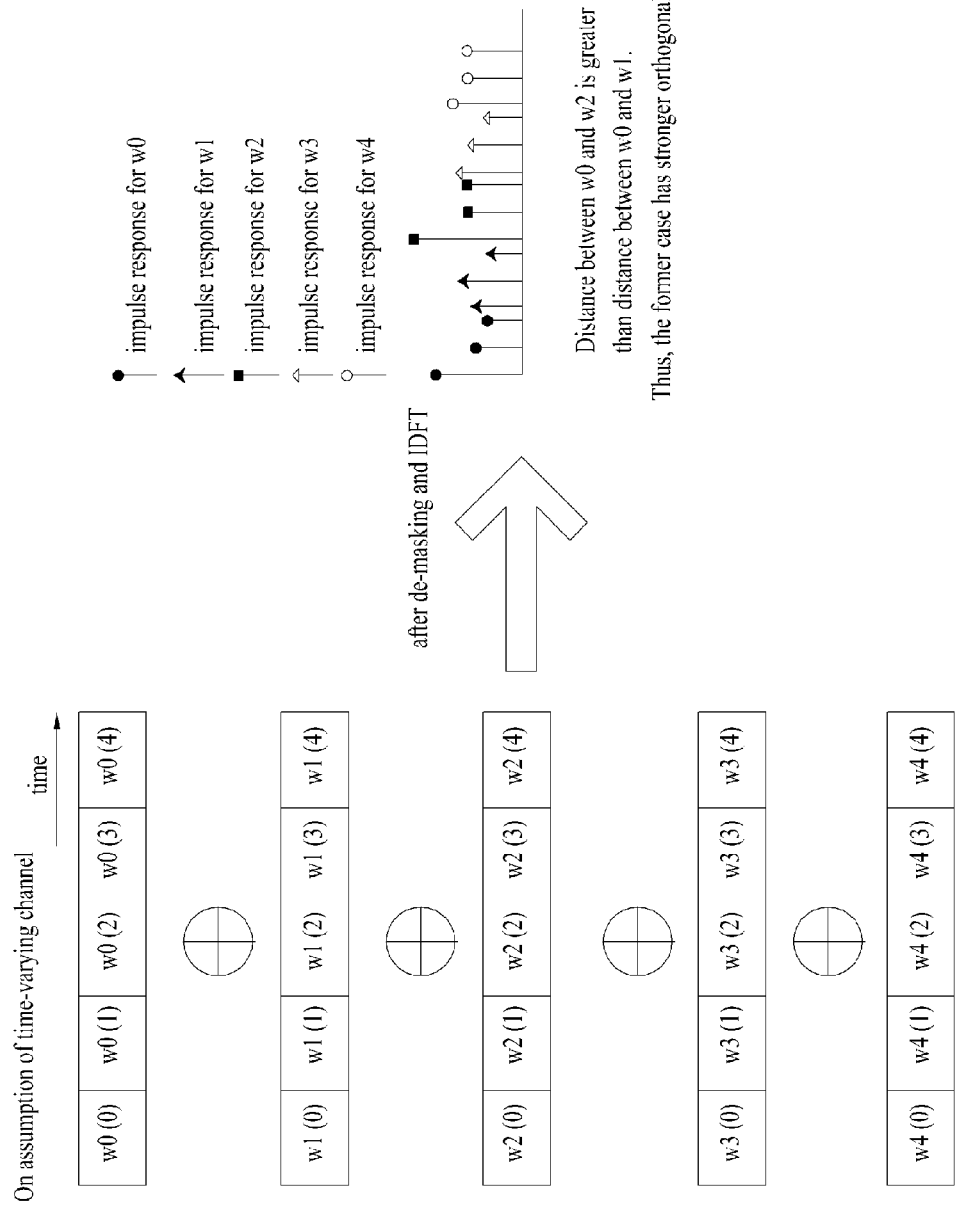
FIG. 33 illustrates the influence of a code distance upon the orthogonality of orthogonal codes.

The reason why the orthogonality of codes having close indices $n_{oc}$ is less robust is described below with reference to FIG. 33. When a correlation calculation (i.e., IDFT calculation) is performed on DFT codes, an impulse response is obtained due to the characteristics of DFT codes. When a channel is static in the SC-FDMA symbol domain, the channel is in a flat fading state. In this case, after IDFT calculation is performed, the orthogonality of the codes is guaranteed since the channel response of each of the codes is expressed as a delta function. However, the channel is in a selective channel state when the channel is time-variant, for example, when the channel changes due to high speed movement. In this case, after IDFT calculation, the channel response of each code is expressed as an impulse response for a multi-path channel as illustrated in FIG. 33. In this case, codes having close indices $n_{oc}$ may overlap as shown. Accordingly, when the channel varies, it is possible to maintain the orthogonality of the codes more robustly to the external environment as the distance (i.e., difference) between the codes increases.

As described above with reference to FIG. 32, when the shortened PUCCH format 3 is employed, a DFT code of SF=5 may be used in slot 0 and a Walsh code of SF=4 may be used in slot 1. When a high speed scenario is taken into consideration, the orthogonality may be significantly deteriorated at a subframe level if a number of UEs (or a number of antenna ports) use codes having a small distance therebetween in slot 0 and a number of UEs (or a number of antenna ports) use codes having weak partial orthogonality in slot 1.

A code distance for estimating the orthogonal performance between orthogonal codes may be defined as follows.

In the case of SF=5 codes (e.g., DFT codes), the distance (d) between an orthogonal code of $n_{oc}=m$ (hereinafter referred to as code $n_{oc}\#m$) and an orthogonal code of $n_{oc}=n$ (hereinafter referred to as code $n_{oc}\#n$) may be defined as follows. According to this definition, in the case of SF=5, the orthogonality is more robust to the communication environment as the code distance increases.

If$|n_{oc}\#m-n_{oc}\#n|>\text{floor}(SF/2), d=5-|n_{oc}\#m-n_{oc}\#n|,$

Else, $d=|n_{oc}\#m-n_{oc}\#n|$

End                                                              Expression 17

Here, SF=5 and m and n are integers between 0 and 4. | | denotes an absolute value. floor ( ) denotes a flooring function.

Table 17 shows the distance between DFT codes of SF=5 according to the above expression. Here, mapping between $n_{oc}$ and the orthogonal code is equal to that of the conventional code configuration of Table 15.

TABLE 17

| [$n_{oc}$ # m, $n_{oc}$ # n] | Distance |
| --- | --- |
| (0, 1) | 1 |
| (0, 2) | 2 |
| (0, 3) | 2 |
| (0, 4) | 1 |
| (1, 2) | 1 |
| (1, 3) | 2 |
| (1, 4) | 2 |
| (2, 3) | 1 |
| (2, 4) | 2 |
| (3, 4) | 1 |

Then, in the case of codes of SF=4 (for example, Walsh codes or Hadamard codes), the code distance may be defined taking into consideration partial orthogonality. For example, the code distance may be defined as the sum of an absolute value of the cross-correlation of the first two elements of the four elements and an absolute value of the cross-correlation of the last two elements thereof. According to this definition, in the case of SF=4, the orthogonality is more robust to the communication environment as the code distance decreases.

Table 18 shows distances between SF=4 Walsh codes. Here, Table 18 employs the same mapping of $n_{oc}$ and orthogonal codes as that of the same code configuration as that of Table 15.

TABLE 18

| [$n_{oc}$ # m, $n_{oc}$ # n] | Distance between [w(0) w(1)] | Distance between [w(2) w(3)] | Total distance (sum of partial distances) |
| --- | --- | --- | --- |
| (0, 1) | 0 | 0 | 0 |
| (0, 2) | 0 | 0 | 0 |
| (0, 3) | 2 | 2 | 4 |
| (1, 2) | 2 | 2 | 4 |
| (1, 3) | 0 | 0 | 0 |
| (2, 3) | 0 | 0 | 0 |

Table 19 shows the code distance when the code configuration of Table 15 is used. In this example, it is assumed that the shortened PUCCH format is employed. Accordingly, it is illustrated in Table 19 that only $n_{oc}$=0, 1, 2, 3 are used in the case of SF=5. Table 19 shows the case in which the same code index is used in slot 0 and slot 1 according to Expression 14.

TABLE 19

| [$n_{oc}$ # m, $n_{oc}$ # n] | Distances between SF = 5 OCs | Total distance between SF = 4 OCs (sum of partial distances) |
|---|---|---|
| (0, 1) | 1 | 0 |
| (0, 2) | 2 | 0 |
| (0, 3) | 2 | 4 |
| (1, 2) | 1 | 4 |
| (1, 3) | 2 | 0 |
| (2, 3) | 1 | 0 |

The meaning of the code distance may be defined as follows. The robustness of orthogonality increases as the distance value increases in the case of SF=5 and increases as the distance value decreases in the case of SF=4. Accordingly, in the case of [$n_{oc}$#m,$n_{oc}$#n]=(1,2), the worst code distance is present in both slots. For example, let us assume that UE A (or antenna port A) transmits a PUCCH using $n_{oc}$=1 and UE B (or antenna port B) transmits a PUCCH using $n_{oc}$=2. In this case, the orthogonality may not be guaranteed in both slots according to the communication environment.

The present invention suggests a method for randomizing the code distance at a slot level in order to overcome the above problems. In the present invention, it is assumed that the shortened PUCCH format 3 is used. Accordingly, the present invention will be described with reference to an example in which only $n_{oc}$=0, 1, 2, 3 are used even when SF=5 unless specifically stated otherwise. However, this example is not intended to exclude use of $n_{oc}$=0, 1, 2, 3, 4 when SF=5.

Specifically, the present invention suggests that an index $n_{oc}$ in slot 0 which uses SF=5 and an index $n_{oc}$ in slot 1 which uses SF=4 be used differently with reference to the configuration of Table 15. For example, according to the present invention, it is given that $n_{oc,0} \neq n_{oc,1}$ when a code index used in slot 0 is referred to as $n_{oc,0}$ and a code index used in slot 1 is referred to as $n_{oc,1}$. On the other hand, according to the conventional PUCCH format 3, it is given that $n_{oc,0}=n_{oc,1}$ with reference to the configuration of Table 15. Preferably, if it is assumed that indices $\{n_{oc,0(m)}, n_{oc,1(m)}\}$ and indices $\{n_{oc,0(n)}, n_{oc,1(n)}\}$ are given such that the distance between $n_{oc,0(m)}$ and $n_{oc,0(n)}$ in slot 0 (SF=5 OC) is great (or small), it is also possible to configure orthogonal code indices such that the distance between $n_{oc,1(m)}$ and $n_{oc,1(n)}$ in slot 1 (SF=4 OC) is great (or small). Accordingly, when the shortened PUCCH format 3 is used, it is possible to prevent a reduction in the orthogonality performance of spread codes in both slots.

In an exemplary implementation, the method suggested in the present invention may be implemented such that the same code index is used in slot 0 and slot 1 (i.e., $n_{oc,0}=n_{oc,1}$). In this case, the code index of each slot may be given by Expression 14. In the following description, $n_{oc,0}$ and $n_{oc,1}$ are referred to as $n_{oc}$ unless specifically stated otherwise for ease of explanation (i.e., $n_{oc}=(n_{oc,0}=n_{oc,1})$). In this example, since the same code index is used for slot 0 and slot 1, there is a need to change mapping between the code index and the orthogonal code in Table 15 in order to apply the suggestion of the present invention. That is, mapping between the code index ($n_{oc,0}$) and the orthogonal code in slot 0 may be changed mapping between the code index ($n_{oc,1}$) and the orthogonal code in slot 1 may be changed.

Specifically, it is possible to change mapping between the code index $n_{oc}$ and the orthogonal code in slot 0 and/or slot 1 for [$n_{oc}$#m,$n_{oc}$#n]=(1,2) which is described above with reference to Table 15 and Table 19. That is, in Table 15, the order of OCs in a column of $N_{SF}^{PUCCH}$=5 and/or a column of $N_{SF}^{PUCCH}$=4 may be changed such that the code distance is randomized at a slot level.

In this regard, the case in which the distance between OCs of SF=4 is 4 occurs for a combination of [$n_{oc}$#m,$n_{oc}$#n]=(0,3). Accordingly, it is possible to consider a method in which, when one of SF=5 OCs corresponding to $n_{oc}$=1 or $n_{oc}$=2 is changed, the distance between the distance between SF=5 OCs of a combination of [$n_{oc}$#m,$n_{oc}$#n]=(1,2) is optimized without changing the distance between SF=5 OCs of a combination of [$n_{oc}$#m,$n_{oc}$#n]=(0,3). In one example, OCs corresponding to $n_{oc}$=0 and $n_{oc}$=1 may be exchanged only for SF=5. In another example, $n_{oc}$=2 and $n_{oc}$=3 may be exchanged only for SF=5.

Table 20 shows an example in which OCs corresponding to $n_{oc}$=0 and $n_{oc}$=1 may be exchanged only for $N_{SF}^{PUCCH}$=5 (i.e., SF=5). Table 21 shows distance values for the configuration of Table 20. Table 22 shows an example in which OCs corresponding to $n_{oc}$=2 and $n_{oc}$=3 may be exchanged only for $N_{SF}^{PUCCH}$=5 (i.e., SF=5). Table 23 shows distance values for the configuration of Table 22. Since it is assumed in this example that the shortened PUCCH format 3 is used as described above, it is assumed here that only $n_{oc}$=0, 1, 2, 3 are also used for SF=5.

TABLE 20

| Sequence index $n_{oc}$ | Orthogonal sequence $[w_{n_{oc}}(0) \ldots w_{n_{oc}}(N_{SF}^{PUCCH}-1)]$ | |
|---|---|---|
| | $N_{SF}^{PUCCH}$ = 5 | $N_{SF}^{PUCCH}$ = 4 |
| 0 | $[1\ e^{j2\pi/5}\ e^{j4\pi/5}\ e^{j6\pi/5}\ e^{j8\pi/5}]$ | [+1 +1 +1 +1] |
| 1 | [1 1 1 1 1] | [+1 −1 +1 −1] |
| 2 | $[1\ e^{j4\pi/5}\ e^{j8\pi/5}\ e^{j2\pi/5}\ e^{j6\pi/5}]$ | [+1 −1 −1 +1] |
| 3 | $[1\ e^{j6\pi/5}\ e^{j2\pi/5}\ e^{j8\pi/5}\ e^{j4\pi/5}]$ | [+1 +1 −1 −1] |
| 4 | $[1\ e^{j8\pi/5}\ e^{j6\pi/5}\ e^{j4\pi/5}\ e^{j2\pi/5}]$ | — |

TABLE 21

| [$n_{oc}$ # m, $n_{oc}$ # n] | Distance between SF = 5 OCs | Total distance between SF = 4 OCs (sum of partial distances) |
|---|---|---|
| (0, 1) | 1 | 0 |
| (0, 2) | 1 | 0 |
| (0, 3) | 2 | 4 |
| (1, 2) | 2 | 4 |
| (1, 3) | 2 | 0 |
| (2, 3) | 1 | 0 |

TABLE 22

| sequence index $n_{oc}$ | orthogonal sequence $[w_{n_{oc}}(0) \ldots w_{n_{oc}}(N_{SF}^{PUCCH}-1)]$ | |
|---|---|---|
| | $N_{SF}^{PUCCH}$ = 5 | $N_{SF}^{PUCCH}$ = 4 |
| 0 | [1 1 1 1 1] | [+1 +1 +1 +1] |
| 1 | $[1\ e^{j2\pi/5}\ e^{j4\pi/5}\ e^{j6\pi/5}\ e^{j8\pi/5}]$ | [+1 −1 +1 −1] |
| 2 | $[1\ e^{j6\pi/5}\ e^{j2\pi/5}\ e^{j8\pi/5}\ e^{j4\pi/5}]$ | [+1 −1 −1 +1] |
| 3 | $[1\ e^{j4\pi/5}\ e^{j8\pi/5}\ e^{j2\pi/5}\ e^{j6\pi/5}]$ | [+1 +1 −1 −1] |
| 4 | $[1\ e^{j8\pi/5}\ e^{j6\pi/5}\ e^{j4\pi/5}\ e^{j2\pi/5}]$ | — |

TABLE 23

| [$n_{oc}$ # m, $n_{oc}$ # n] | distance between SF = 5 OCs | total distance between SF = 4 OCs (sum of partial distances) |
|---|---|---|
| (0, 1) | 1 | 0 |
| (0, 2) | 2 | 0 |
| (0, 3) | 2 | 4 |
| (1, 2) | 2 | 4 |
| (1, 3) | 1 | 0 |
| (2, 3) | 1 | 0 |

Referring to Tables 21 and 23, in the case of [$n_{oc}$#m, $n_{oc}$#n]=(0,3) and (1,2), it is possible to maintain the optimal orthogonality between PUCCH signals in the 1st slot in which SF=5 while the orthogonality between PUCCH signals in the 2nd slot in which SF=4 is worst. Accordingly, it is possible to prevent the occurrence of a worst code distance in both slots and therefore it is possible to guarantee the orthogonality between PUCCH signals in various communication environments (e.g., in a high speed environment).

In another example, mapping between the code index $n_{oc}$ and the OC may be changed only for SF=4. For example, OCs corresponding to $n_{oc}$=0 and $n_{oc}$=1 may be exchanged only for SF=4. In another example, OCs corresponding to $n_{oc}$=2 and $n_{oc}$=3 may be exchanged only for SF=4.

Table 24 shows an example in which OCs corresponding to $n_{oc}$=0 and $n_{oc}$=1 are exchanged only for $N_{SF}^{PUCCH}$=4 (i.e., SF=4) in Table 15. Table 25 shows distance values for the configuration of Table 24. Table 26 shows an example in which OCs corresponding to $n_{oc}$=2 and $n_{oc}$=3 are exchanged only for $N_{SF}^{PUCCH}$=4 (i.e., SF=4) in Table 15. Table 27 shows distance values for the configuration of Table 26.

TABLE 24

| Sequence index $n_{oc}$ | Orthogonal sequence [$w_{n_{oc}}(0) \ldots w_{n_{oc}}(N_{SF}^{PUCCH} - 1)$] | |
|---|---|---|
| | $N_{SF}^{PUCCH} = 5$ | $N_{SF}^{PUCCH} = 4$ |
| 0 | [1 1 1 1 1] | [+1 −1 +1 −1] |
| 1 | [1 $e^{j2\pi/5}$ $e^{j4\pi/5}$ $e^{j6\pi/5}$ $e^{j8\pi/5}$] | [+1 +1 +1 +1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

TABLE 25

| [$n_{oc}$ # m, $n_{oc}$ # n] | Distance between SF = 5 OCs | Total distance between SF = 4 OCs (sum of partial distances) |
|---|---|---|
| (0, 1) | 1 | 0 |
| (0, 2) | 2 | 4 |
| (0, 3) | 2 | 4 |
| (1, 2) | 1 | 0 |
| (1, 3) | 2 | 0 |
| (2, 3) | 1 | 0 |

TABLE 26

| sequence index $n_{oc}$ | orthogonal sequence [$w_{n_{oc}}(0) \ldots w_{n_{oc}}(N_{SF}^{PUCCH} - 1)$] | |
|---|---|---|
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

TABLE 27

| [$n_{oc}$ # m, $n_{oc}$ # n] | distance between SF = 5 OCs | total distance between SF = 4 OCs (sum of partial distances) |
|---|---|---|
| (0, 1) | 1 | 0 |
| (0, 2) | 2 | 4 |
| (0, 3) | 2 | 0 |
| (1, 2) | 1 | 0 |
| (1, 3) | 2 | 4 |
| (2, 3) | 1 | 0 |

Referring to Tables 25 and 27, in the case of [$n_{oc}$#m, $n_{oc}$#n]=(0,1), (1,2) and (2,3), it is possible to maintain the optimal orthogonality between PUCCH signals in the 2nd slot in which SF=4 while the orthogonality between PUCCH signals in the 1st slot in which SF=5 is worst. Accordingly, it is possible to prevent the occurrence of a worst code distance in both slots and therefore it is possible to guarantee the orthogonality between PUCCH signals in various communication environments (e.g., in a high speed environment).

The following is a description of another aspect of the present invention. Generally, UL synchronization is determined using a PRACH preamble transmitted from the UE. When the UE transmits a PRACH preamble to the BS, the BS notifies the UE of a Timing Advance (TA) value using a measured timing value. The UE controls UL transmission timing according to the TA. As a result, the BS can receive signals from all UEs at the same timing. On the other hand, in 3GPP Rel-8, since the granularity of the TA is a multiple of 0.52us, there is ambiguity within ±0.52us. Accordingly, the present invention suggests OC design taking into consideration the residual timing.

Figure 34:
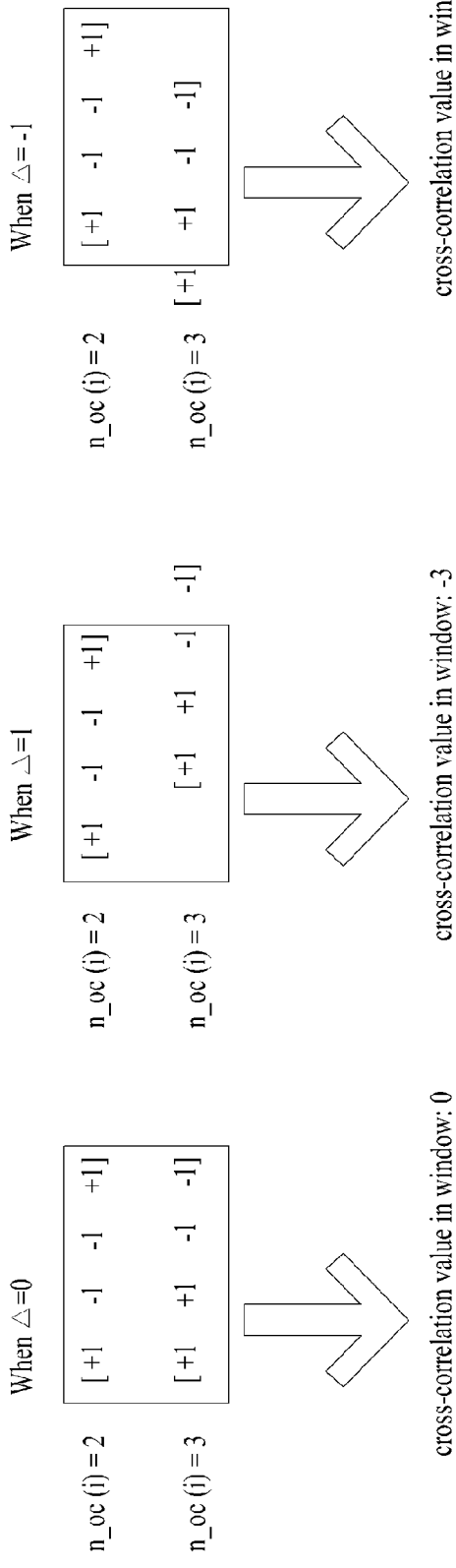
FIG. 34 illustrates the influence of a code distance upon the orthogonality of orthogonal codes.

FIG. 34 illustrates the influence which the residual timing exerts upon the orthogonality of orthogonal codes.

First, for explanation, Table 15 is rewritten as Table 28.

TABLE 28

| Sequence index $n_{oc}$ | Orthogonal sequence [$w_{n_{oc}}(0) \ldots w_{n_{oc}}(N_{SF}^{PUCCH} - 1)$] | |
|---|---|---|
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

In this example, it is assumed that SF=4 OC vectors corresponding to $n_{oc}$=2 and $n_{oc}$=3 are used in slot 1 of the PUCCH format 3. The following are OC vectors corresponding to $n_{oc}$=2 and $n_{oc}$=3.

$n_{oc}$=2: [+1 −1 −1 +1]

$n_{oc}$=3: [+1 +1 −1 −1]

Referring to FIG. 34, when residual timing effects are taken into consideration, there may be a difference (Δ)

between the times at which OC vectors corresponding to $n_{oc}=2$ and $n_{oc}=3$ are received by the BS. Specifically, when $\Delta=0$, the BS simultaneously receives OC vectors corresponding to $n_{oc}=2$ and $n_{oc}=3$. On the other hand, when $\Delta=1$, the BS receives an OC vector corresponding to $n_{oc}=3$ one symbol later. Therefore, the BS sees a +1 shift version vector of an OC vector corresponding to $n_{oc}=3$. Similarly, when $\Delta=-1$, the BS receives an OC vector corresponding to $n_{oc}=3$ one symbol earlier. Therefore, the BS sees a −1 shift version vector of an OC vector corresponding to $n_{oc}=3$. As shown, the orthogonality between codes is maintained when $\Delta=0$ while the cross-correlation value increases when $\Delta=+1$ or −1. That is, the orthogonality performance of orthogonal codes may be significantly deteriorated when there is a difference between times at which OC vectors are received due to the residual timing effects or the like.

Accordingly, it is possible to take into consideration OC exchange described above in order to solve the above problems. In OC exchange of Table 15 (or Table 28), exchange of SF=5 codes (for example, DFT codes) is equivalent to exchange of SF=4 codes (for example, Walsh codes). Although, for ease of explanation, the following description is given only of exchange of SF=4 OCs, the present invention includes exchange of SF=5 OCs.

Table 29 shows an example of exchange of OCs corresponding to $n_{oc}=0$ and $n_{oc}=3$ only for $N_{SF}^{PUCCH}=4$ (i.e., SF=4) in Table 15 (or Table 28).

TABLE 29

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 +1 −1 −1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 +1 +1] |
| 4 | [1 $e^{j8\pi/5}$ $e^{j6\pi/5}$ $e^{j4\pi/5}$ $e^{j2\pi/5}$] | — |

Figure 35:
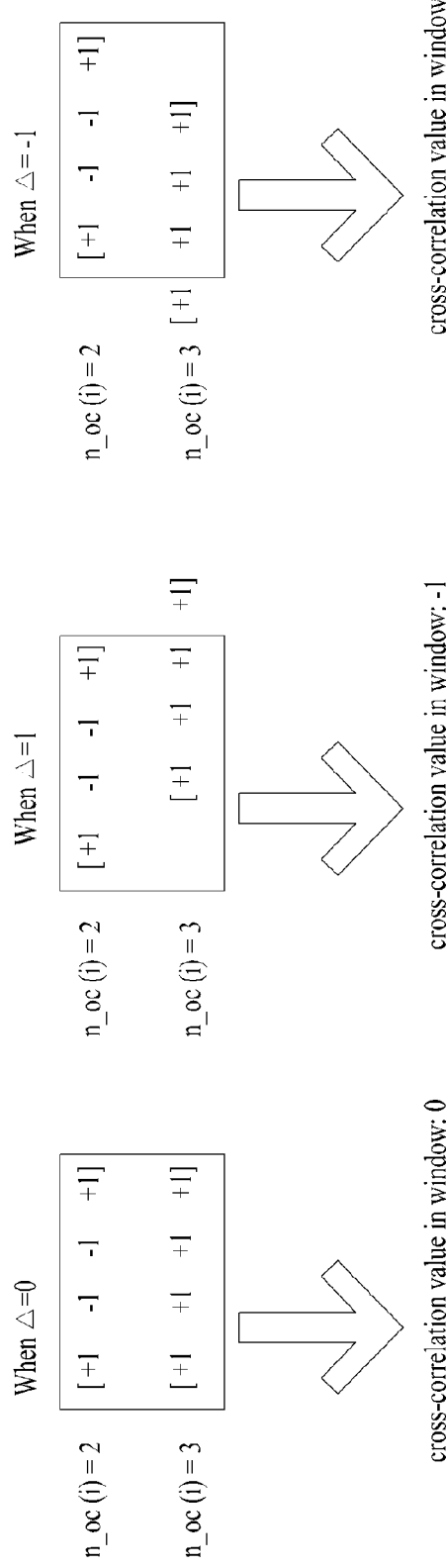
FIG. 35 illustrates the orthogonality performance of codes configured according to an embodiment of the present invention.

FIG. 35 shows orthogonality performance of codes when the code configuration of Table 28 is used. Similar to FIG. 34, it is assumed that SF=4 OC vectors corresponding to $n_{oc}=2$ and $n_{oc}=3$ are used in slot 1 of the PUCCH format 3. The following are OC vectors corresponding to $n_{oc}=2$ and $n_{oc}=3$.

$n_{oc}=2$: [+1 −1 −1 +1]

$n_{oc}=3$: [+1 +1 +1 +1]

From FIG. 35, it can be seen that the cross-correlation value between codes is small, specifically, the cross-correlation value between codes is 0 when $\Delta=0$ and −1 when $\Delta=+1$ or −1. Accordingly, it is possible to efficiently maintain orthogonality performance of orthogonal codes even when there is a difference between the times at which OC vectors are received due to the residual timing effect or the like.

Tables 30 to 35 show various modified examples in which OC exchange is applied to $N_{SF}^{PUCCH}=4$ (i.e., SF=4) of Table 15 (or Table 28). Table 30 shows an example in which OCs corresponding to $n_{oc}=0$ and $n_{oc}=1$ are exchanged. Table 31 shows an example in which OCs corresponding to $n_{oc}=0$ and $n_{oc}=2$ are exchanged. Table 32 shows an example in which OCs corresponding to $n_{oc}=0$ and $n_{oc}=3$ are exchanged. Table 33 shows an example in which OCs corresponding to $n_{oc}=1$ and $n_{oc}=2$ are exchanged. Table 34 shows an example in which OCs corresponding to $n_{oc}=0$ and $n_{oc}=3$ are exchanged. Table 35 shows an example in which OCs corresponding to $n_{oc}=2$ and $n_{oc}=3$ are exchanged. Although these examples show the cases in which OCs (for example, Walsh codes) are exchanged only for a column of $N_{SF}^{PUCCH}=4$ in Table 15, such exchange is equivalent to exchange of OCs (for example, DFT codes) in a column of $N_{SF}^{PUCCH}=5$ as described above.

TABLE 30

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 −1 +1 −1] |
| 1 | [1 $e^{j2\pi/5}$ $e^{j4\pi/5}$ $e^{j6\pi/5}$ $e^{j8\pi/5}$] | [+1 +1 +1 +1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

TABLE 31

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 −1 −1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 +1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

TABLE 32

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 +1 −1 −1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 +1 +1] |
| 4 | [1 $e^{j8\pi/5}$ $e^{j6\pi/5}$ $e^{j4\pi/5}$ $e^{j2\pi/5}$] | — |

TABLE 33

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 −1 +1] |
| 2 | [1 $e^{j4\pi/5}$ $e^{j8\pi/5}$ $e^{j2\pi/5}$ $e^{j6\pi/5}$] | [+1 −1 +1 −1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

TABLE 34

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 +1 −1 −1] |
| 2 | [1 $e^{j4\pi/5}$ $e^{j8\pi/5}$ $e^{j2\pi/5}$ $e^{j6\pi/5}$] | [+1 −1 −1 +1] |

TABLE 34-continued

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 3 | $[1\ e^{j6\pi/5}\ e^{j2\pi/5}\ e^{j8\pi/5}\ e^{j4\pi/5}]$ | $[+1\ -1\ +1\ -1]$ |
| 4 | $[1\ e^{j8\pi/5}\ e^{j6\pi/5}\ e^{j4\pi/5}\ e^{j2\pi/5}]$ | — |

TABLE 35

| Sequence index $n_{oc}$ | Orthogonal sequence $[w_{n_{oc}}(0) \ldots w_{n_{oc}}(N_{SF}^{PUCCH} - 1)]$ | |
| --- | --- | --- |
| | $N_{SF}^{PUCCH} = 5$ | $N_{SF}^{PUCCH} = 4$ |
| 0 | $[1\ 1\ 1\ 1\ 1]$ | $[+1\ +1\ +1\ +1]$ |
| 1 | $[1\ e^{j2\pi/5}\ e^{j4\pi/5}\ e^{j6\pi/5}\ e^{j8\pi/5}]$ | $[+1\ -1\ +1\ -1]$ |
| 2 | $[1\ e^{j4\pi/5}\ e^{j8\pi/5}\ e^{j2\pi/5}\ e^{j6\pi/5}]$ | $[+1\ +1\ -1\ -1]$ |
| 3 | $[1\ e^{j6\pi/5}\ e^{j2\pi/5}\ e^{j8\pi/5}\ e^{j4\pi/5}]$ | $[+1\ -1\ -1\ +1]$ |
| 4 | $[1\ e^{j8\pi/5}\ e^{j6\pi/5}\ e^{j4\pi/5}\ e^{j2\pi/5}]$ | — |

Figure 36:
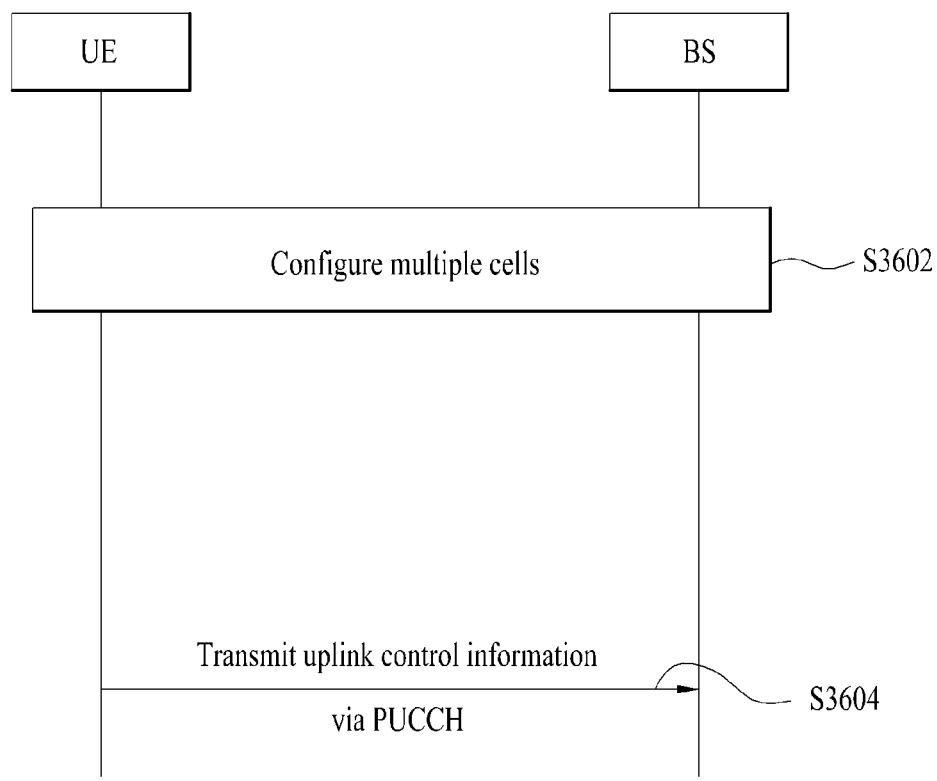
FIG. 36 illustrates an example in which PUCCH signals are transmitted according to an embodiment of the present invention.

FIG. 36 illustrates an example in which PUCCH signals are transmitted according to an embodiment of the present invention.

As shown in FIG. 36, a BS and a UE configure a plurality of cells (S3602). The plurality of cells includes one PCell and one or more SCells. Thereafter, the UE transmits uplink control information through a PUCCH (S3604). The uplink control information includes at least one of scheduling request information, channel state information, and reception response information (for example, an ACK/NACK/DTX response) of a downlink signal. Here, the downlink signal includes a PDCCH signal or a PDSCH corresponding to the PDCCH signal and the PDCCH signal includes a PDCCH (SCell PDCCH) signal that is transmitted in an SCell.

In this example, the PUCCH includes a PUCCH format 3. A procedure for transmitting a PUCCH signal includes a procedure for determining PUCCH resource allocation and a procedure for generating a PUCCH signal. PUCCH resource allocation may be performed using Expression 14. The PUCCH signal generation procedure may include the procedures described above with reference to FIGS. 29 to 32. Specifically, the PUCCH signal generation procedure includes a procedure for block-spreading a modulation symbol block at an SC-FDMA symbol level. Here, orthogonal codes used for block spreading have been randomized at a slot level. For example, block spreading may be performed using the code configurations of Tables 20, 22, 24, 26 and 29 to 35.

Figure 37:
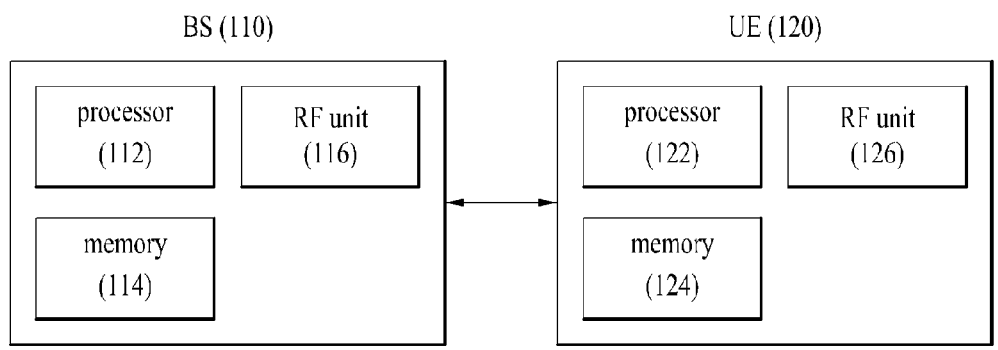
FIG. 37 illustrates a BS and a UE to which an embodiment of the present invention can be applied.

FIG. 37 illustrates a BS and a UE to which an embodiment of the present invention can be applied. When a relay is included in the wireless communication system, communication is performed between the BS and the relay in a backhaul link and communication is performed between the relay and the UE in an access link. Accordingly, the BS or the UE illustrated in FIG. 37 may be replaced with the relay according to circumstance.

As shown in FIG. 37, the wireless communication system includes a BS 110 and a UE 120. The BS 110 includes a processor 112, a memory 114, and a Radio Frequency (RF) unit 116. The processor 112 may be configured so as to implement the procedures and/or methods suggested in the present invention. The memory 114 is connected to the processor 112 and stores various information associated with operation of the processor 112. The RF unit 116 is connected to the processor 112 and transmits and/or receives radio signals. The UE 120 includes a processor 122, a memory 124, and an RF unit 126. The processor 122 may be configured so as to implement the procedures and/or methods suggested in the present invention. The memory 124 is connected to the processor 122 and stores various information associated with operation of the processor 122. The RF unit 126 is connected to the processor 122 and transmits and/or receives radio signals. The BS 110 and/or the UE 120 may include a single antenna or multiple antennas.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the signal communication relationship between a terminal (UE) and a Base Station (BS). The communication relationship may be extended (or may be equally or similarly applied) to signal communication between a terminal and a relay or between a relay and a BS. Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case in which the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

INDUSTRIAL APPLICABILITY

The present invention is applicable to a UE, a BS, or other equipment in a wireless mobile communication system. Specifically, the present invention is applicable to a method for transmitting uplink control information and an apparatus for the same.

The invention claimed is:

1. A method for a communication device supporting high-speed mobility to transmit a Physical Uplink Control Channel (PUCCH) signal in a subframe in a wireless communication system, the method comprising:
    block-spreading, by the communication device supporting high-speed mobility, first modulation symbols and second modulation symbols,
    wherein, when a Sounding Reference Signal (SRS) transmission is configured in the subframe,
        the first modulation symbols are block-spread using an orthogonal sequence of length 5 ($N_{SF}^{PUCCH}=5$) corresponding to a sequence index $n_{oc}$ to obtain first modulation symbol sequences, and
        the second modulation symbols are block-spread using an orthogonal sequence of length 4 ($N_{SF}^{PUCCH}=4$) corresponding to the sequence index $n_{oc}$ to obtain second modulation symbol sequences, and
    wherein, when the SRS transmission is not configured in the subframe,
        the first modulation symbols are block-spread using the orthogonal sequence of length 5 ($N_{SF}^{PUCCH}=5$) corresponding to the sequence index $n_{oc}$ to obtain the first modulation symbol sequences, and
        the second modulation symbols are block-spread using the orthogonal sequence of length 5 ($N_{SF}^{PUCCH}=5$) corresponding to the sequence index $n_{oc}$ to obtain the second modulation symbol sequences;
    performing, by the communication device supporting high-speed mobility, cyclic shifting and Discrete Fourier Transform (DFT) preceding on the first and second modulation symbol sequences to obtain complex-valued symbols;
    mapping, by the communication device supporting high-speed mobility, the complex-valued symbols to physical resources for PUCCH transmission; and
    transmitting, by the communication device supporting high-speed mobility, the PUCCH signal to a base station supporting high speed mobility,
    wherein both of the orthogonal sequences of length 5 and length 4 are given by the sequence index $n_{oc}$ according to the following relation:

| sequence index $n_{oc}$ | orthogonal sequence $[w_{n_{oc}}(0) \ldots w_{n_{oc}}(N_{SF}^{PUCCH}-1)]$ | |
| --- | --- | --- |
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1]. |

2. The method according to claim 1, wherein, when the SRS transmission is configured in the subframe, the PUCCH signal is transmitted using 5 Single Carrier Frequency Division Multiple Access (SC-FDMA) symbols in slot 0 and is transmitted using 4 SC-FDMA symbols in slot 1.

3. The method according to claim 2, wherein the PUCCH signal is transmitted using SC-FDMA symbols of indices 0, 2, 3, 4, and 6 in the slot 0 and is transmitted using SC-FDMA symbols of indices 0, 2, 3, and 4 in the slot 1.

4. The method according to claim 1, wherein the first modulation symbol sequence is transmitted through the slot 0 and the second modulation symbol sequence is transmitted through the slot 1.

5. The method according to claim 1, wherein the PUCCH signal includes Uplink Control Information (UCI).

6. The method according to claim 1, wherein a plurality of serving cells are configured for the communication device.

7. A communication device supporting high-speed mobility and configured to transmit a Physical Uplink Control Channel (PUCCH) signal in a subframe in a wireless communication system, the communication device comprising:
    a Radio Frequency (RF) unit; and
    a processor,
    wherein the processor is configured to:
        when a Sounding Reference Signal (SRS) transmission is configured in the subframe,
            block-spread first modulation symbols using an orthogonal sequence of length 5 ($N_{SF}^{PUCCH}=5$) corresponding to a sequence index $n_{oc}$ to obtain first modulation symbol sequences, and
            block-spread second modulation symbols using an orthogonal sequence of length 4 ($N_{SF}^{PUCCH}=4$) corresponding to the sequence index $n_{oc}$ to obtain second modulation symbol sequences, and
        wherein, when the SRS transmission is not configured in the subframe,
            the first modulation symbols are block-spread using the orthogonal sequence of length 5 ($N_{SF}^{PUCCH}=5$) corresponding to the sequence index $n_{oc}$ to obtain the first modulation symbol sequences, and
            the second modulation symbols are block-spread using the orthogonal sequence of length 5 ($N_{SF}^{PUCCH}=5$) corresponding to the sequence index $n_{oc}$ to obtain the second modulation symbol sequences,
        perform cyclic shifting and Discrete Fourier Transform (DFT) preceding on the first and second modulation symbol sequences to obtain complex-valued symbols,
        map the complex-valued symbols to physical resources for PUCCH transmission, and
        transmit the PUCCH signal to a base station supporting high speed mobility,
    wherein both of the orthogonal sequences of length 5 and length 4 are given by the sequence index $n_{oc}$ according to the following relation:

| sequence index $n_{oc}$ | orthogonal sequence $[w_{n_{oc}}(0) \ldots w_{n_{oc}}(N_{SF}^{PUCCH}-1)]$ | |
| --- | --- | --- |
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |

-continued

| sequence index $n_{oc}$ | orthogonal sequence $[w_{n_{oc}}(0) \ldots w_{n_{oc}}(N_{SF}^{PUCCH} - 1)]$ | |
|---|---|---|
| | $N_{SF}^{PUCCH} = 5$ | $N_{SF}^{PUCCH} = 4$ |
| 2 | $[1 \; e^{j4\pi/5} \; e^{j8\pi/5} \; e^{j2\pi/5} \; e^{j6\pi/5}]$ | $[+1 \; +1 \; -1 \; -1]$ |
| 3 | $[1 \; e^{j6\pi/5} \; e^{j2\pi/5} \; e^{j8\pi/5} \; e^{j4\pi/5}]$ | $[+1 \; -1 \; -1 \; +1]$. |

8. The communication device according to claim 7, wherein, when the SRS transmission is configured in the subframe, the PUCCH signal is transmitted using 5 Single Carrier Frequency Division Multiple Access (SC-FDMA) symbols in slot 0 and is transmitted using 4 SC-FDMA symbols in slot 1.

9. The communication device according to claim 8, wherein the PUCCH signal is transmitted using SC-FDMA symbols of indices 0, 2, 3, 4, and 6 in the slot 0 and is transmitted using SC-FDMA symbols of indices 0, 2, 3, and 4 in the slot 1.

10. The communication device according to claim 7, wherein the first modulation symbol sequence is transmitted through the slot 0 and the second modulation symbol sequence is transmitted through the slot 1.

11. The communication device according to claim 7, wherein the PUCCH signal includes Uplink Control Information (UCI).

12. The communication device according to claim 7, wherein a plurality of serving cells are configured.

13. The method according to claim 1, wherein, based on the SRS transmission not being configured in the subframe, the PUCCH signal is transmitted using 5 Single Carrier Frequency Division Multiple Access (SC-FDMA) symbols in slot 0 and is transmitted using 5 SC-FDMA symbols in slot 1.

14. The method according to claim 13, wherein the PUCCH signal is transmitted using SC-FDMA symbols of indices 0, 2, 3, 4, and 6 in the slot 0 and is transmitted using SC-FDMA symbols of indices 0, 2, 3, 4, and 6 in the slot 1.

15. The communication device according to claim 7, wherein, based on the SRS transmission not being configured in the subframe, the PUCCH signal is transmitted using 5 Single Carrier Frequency Division Multiple Access (SC-FDMA) symbols in slot 0 and is transmitted using 5 SC-FDMA symbols in slot 1.

16. The communication device according to claim 15, wherein the PUCCH signal is transmitted using SC-FDMA symbols of indices 0, 2, 3, 4, and 6 in the slot 0 and is transmitted using SC-FDMA symbols of indices 0, 2, 3, 4, and 6 in the slot 1.

* * * * *